United States Patent
Marshak et al.

(10) Patent No.: US 9,311,207 B1
(45) Date of Patent: Apr. 12, 2016

(54) DATA STORAGE SYSTEM OPTIMIZATIONS IN A MULTI-TIERED ENVIRONMENT

(71) Applicant: EMC Corporation, Hopkinton, MA (US)

(72) Inventors: Marik Marshak, Newton, MA (US); Alexandr Veprinsky, Brookline, MA (US); Dan Aharoni, Brookline, MA (US); Stephen F. Modica, Uxbridge, MA (US)

(73) Assignee: EMC Corporation, Hopkinton, MA (US)

( * ) Notice: Subject to any disclaimer, the term of this patent is extended or adjusted under 35 U.S.C. 154(b) by 18 days.

(21) Appl. No.: 14/024,793

(22) Filed: Sep. 12, 2013

(51) Int. Cl.
 *G06F 3/00* (2006.01)
 *G06F 5/00* (2006.01)
 *G06F 13/36* (2006.01)
 *G06F 11/30* (2006.01)
 *G06F 11/34* (2006.01)

(52) U.S. Cl.
 CPC ........ *G06F 11/3048* (2013.01); *G06F 11/3089* (2013.01); *G06F 11/3466* (2013.01)

(58) Field of Classification Search
 CPC ............ G06F 11/3048; G06F 11/3089; G06F 11/3466
 USPC ...................................... 710/18, 5, 7, 58, 311
 See application file for complete search history.

(56) References Cited

U.S. PATENT DOCUMENTS

| | | | | |
|---|---|---|---|---|
| 5,778,194 A | * | 7/1998 | McCombs | 713/600 |
| 7,035,970 B1 | * | 4/2006 | Zahavi | 711/114 |
| 7,558,919 B1 | | 7/2009 | Yochai et al. | |
| 7,577,787 B1 | | 8/2009 | Yochai et al. | |
| 7,827,362 B2 | * | 11/2010 | Passerini | 711/154 |
| 7,949,637 B1 | | 5/2011 | Burke | |
| 8,688,878 B1 | * | 4/2014 | Dolan et al. | 710/74 |
| 8,838,931 B1 | * | 9/2014 | Marshak et al. | 711/170 |
| 8,843,671 B1 | * | 9/2014 | Tabor et al. | 710/36 |
| 8,868,797 B1 | * | 10/2014 | Kirac et al. | 710/15 |
| 2003/0191879 A1 | * | 10/2003 | Marmash | 710/113 |
| 2006/0212633 A1 | * | 9/2006 | Kasper | 710/260 |
| 2009/0070541 A1 | | 3/2009 | Yochai | |
| 2010/0332709 A1 | * | 12/2010 | Suzuki et al. | 710/240 |

OTHER PUBLICATIONS

U.S. Appl. No. 13/875,490, filed May 2, 2013, Marshak, et al.

* cited by examiner

*Primary Examiner* — Idriss N Alrobaye
*Assistant Examiner* — Getente A Yimer
(74) *Attorney, Agent, or Firm* — Muirhead and Saturnelli, LLC

(57) ABSTRACT

Described are techniques for processing I/O (input/output) operations. A first observed value of a first performance metric denoting any of a current workload or performance for a first physical device is determined. A target time delay for the first physical device is identified based on the first observed value of the first performance metric. The target time delay specifies a minimum time delay between consecutive host I/Os directed to the first physical device. The target time delay is enforced with respect to consecutive host I/Os directed to the first physical device.

18 Claims, 18 Drawing Sheets

DATA STORAGE SYSTEM OPTIMIZATIONS IN A MULTI-TIERED ENVIRONMENT

BACKGROUND

1. Technical Field

This application generally relates to resource consumption and, more particularly, techniques for regulating resource consumption.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives, and disk interface units. Such data storage systems are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the data storage system directly, but rather, access what appears to the host systems as a plurality of logical units, logical devices or logical volumes. The logical units may or may not correspond to the actual physical disk drives. Allowing multiple host systems to access the single data storage system allows the host systems to share data stored therein.

In connection with data storage, a variety of different technologies may be used. Data may be stored, for example, on different types of disk devices and/or flash memory devices. The data storage environment may define multiple storage tiers in which each tier includes physical devices or drives of varying technologies, performance characteristics, and the like. The physical devices of a data storage system, such as a data storage array, may be used to store data for multiple applications.

An application may execute on a host where the application performs I/O operations. Different techniques may be used in connection with partitioning the resources of the data storage system, or more generally, any system, used by multiple applications, or more generally consumers of the resources or tenants of the system. Storage groups of logical devices may be defined where each such storage group may be used by one or more applications. In some systems, fixed static limits may be imposed and enforced per storage group of logical devices, per logical device, and the like, in connection with resource partitioning on the data storage system. For example, a static limit of a particular amount of cache or other resource of the data storage system may be specified for each logical device so that data operations directed to the storage group are subject to the static limit specifying a maximum amount of the resource that may be used with respect to data operations directed to the logical device.

SUMMARY OF THE INVENTION

In accordance with one aspect of the invention is a method of processing I/O (input/output) operations comprising: determining a first observed value of a first performance metric denoting any of a current workload or performance for a first physical device; identifying a target time delay for the first physical device based on the first observed value of the first performance metric, the target time delay specifying a minimum time delay between consecutive host I/Os directed to the first physical device; and enforcing the target time delay with respect to consecutive host I/Os directed to the first physical device. The method may also include receiving, at a first point in time, a first host I/O operation directed to the first physical device of a data storage system; receiving, at a second point in time, a second host I/O operation directed to the first physical device, the second host I/O operation and the first host I/O operation being consecutive host I/O operations directed to the first physical device; tracking an elapsed time between the first point in time and the second point in time; determining whether the elapsed time is less than the target time delay; and if the elapsed time is less than the target time delay, delaying processing of the second host I/O operation. The method may include if the elapsed time is not less than the target time delay, performing the second host I/O operation; and if the elapsed time is less than the target time delay, processing of the second host I/O operation is delayed by returning a response to a host that sent the second host I/O operation, the response indicating to the host to reissue the second host I/O operation to the data storage system. The first performance metric may be any of response time and utilization. The first observed value for the first performance metric may be determined based on performance for read and write operations directed to the first physical device within a time period. The first observed value for the first performance metric for the first physical device may be determined by performing first processing comprising: determining a response time for the time period for servicing read and write operations directed to the first physical device; determining a utilization of the first physical device in accordance with the response time, wherein the utilization is the first observed value for the first performance metric for the first physical device. The first host I/O operation may identify a first target location that is a first logical device and first logical block address in the logical address range of the first logical device, and wherein the second host I/O operation may identify a second target location that is a second logical device and second logical block address in the logical address range of the second logical device. The first target location may map to a first physical location on the first physical device and wherein the second target location may map to a second physical location on the first physical device. The first host I/O operation may result in performing one or more backend I/O operations to the first physical device and wherein the second host I/O operation may result in performing one or more backend I/O operations to the first physical device. A first received host I/O operation directed to the first physical device may not be processed until an amount of time has elapsed since commencing processing of a previous host I/O operation directed to the first physical device whereby the amount of time that has elapsed may be any of equal to, or greater than, the target time delay. The method may also include completing servicing for a first host I/O operation directed to the first physical device of a data storage system; sending, at a first point in time to a host that issued the issued the first host I/O operation, a first acknowledgement regarding completion of the first host I/O operation; completing, at a second point in time, servicing for a second host I/O operation directed to the first physical device, the second host I/O operation and the first host I/O operation being consecutively completed host I/O operations directed to the first physical device; tracking an elapsed time between the first point in time and the second point in time; determining whether the elapsed time is less than the target time delay; and if the elapsed time is less than the target time delay, delaying sending a second acknowledgement to a host which issued the second host I/O operation until an amount of time that is equal to the target time delay has elapsed. If the elapsed time is not less than the target time delay, the method may include sending a second acknowledgement to a host which issued the second host I/O operation without injecting an additional time delay. The first observed value of the first performance metric may denote any of a current workload or performance for a first physical device for a time period with respect to all read operations which read data from a physical location on the first physical device and all write operations which write data to a physical location on the first physical device. The first observed value of the first performance metric denoting any of a current workload or performance for a first physical device may include a first I/O workload due to host I/O operations processed during the time period, and may include a second I/O workload due to additional processing performed within the data storage system. The additional processing may include any of a data movement optimization that moves a data portion between different storage tiers responsive to a change in workload of the data portion, a RAID group rebuild, and initialization of a physical device. The first physical device may be included in a data storage system having a plurality of storage tiers of physical drives having different performance characteristics and capabilities, the first physical device being included in a first of the plurality of storage tiers. Enforcing the target time delay with respect to consecutive host I/Os directed to the first physical device may include queuing received host I/Os and commencing processing of a next one of the host I/Os that is queued responsive to an amount of time elapsing which equals the target time delay. The target time delay may be enforced with respect to any of: only consecutive host write I/Os directed to the first physical device, only consecutive host read I/Os directed to the first physical device, and both host read and write operations directed to the first physical device.

In accordance with another aspect of the invention is a data storage system comprising: a disk adapter that accesses one or more physical devices for performing I/O (input/output) operations to the one or more physical devices, the disk adapter including a first computer readable medium comprising code stored thereon for: determining first information including a first observed value of a first performance metric denoting any of a current workload or performance for each of the one or more physical devices serviced by the disk adapter, the first information also identifying, for each of the one or more physical devices, one or more logical device address portions having data stored on the each physical device; and storing the first information in a global memory; a front end component that receives host I/O operations, the front end component including a second computer readable medium comprising code stored thereon for: reading the first information from the global memory; identifying a target time delay for at least a first of the one or more physical devices based on the first observed value of the first performance metric for the first physical device, the target time delay specifying a minimum time delay between consecutive host I/Os directed to the first physical device; and enforcing the target time delay with respect to consecutive host I/Os directed to the first physical device.

In accordance with another aspect of the invention is a computer readable medium comprising executable code stored thereon for processing I/O (input/output) operations, the computer readable medium comprising code for: determining a first observed value of a first performance metric denoting any of a current workload or performance for a first physical device; identifying a target time delay for the first physical device based on the first observed value of the first performance metric, the target time delay specifying a minimum time delay between consecutive host I/Os directed to the first physical device; and enforcing the target time delay with respect to consecutive host I/Os directed to the first physical device.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF
EMBODIMENT(S)

Figure 1:
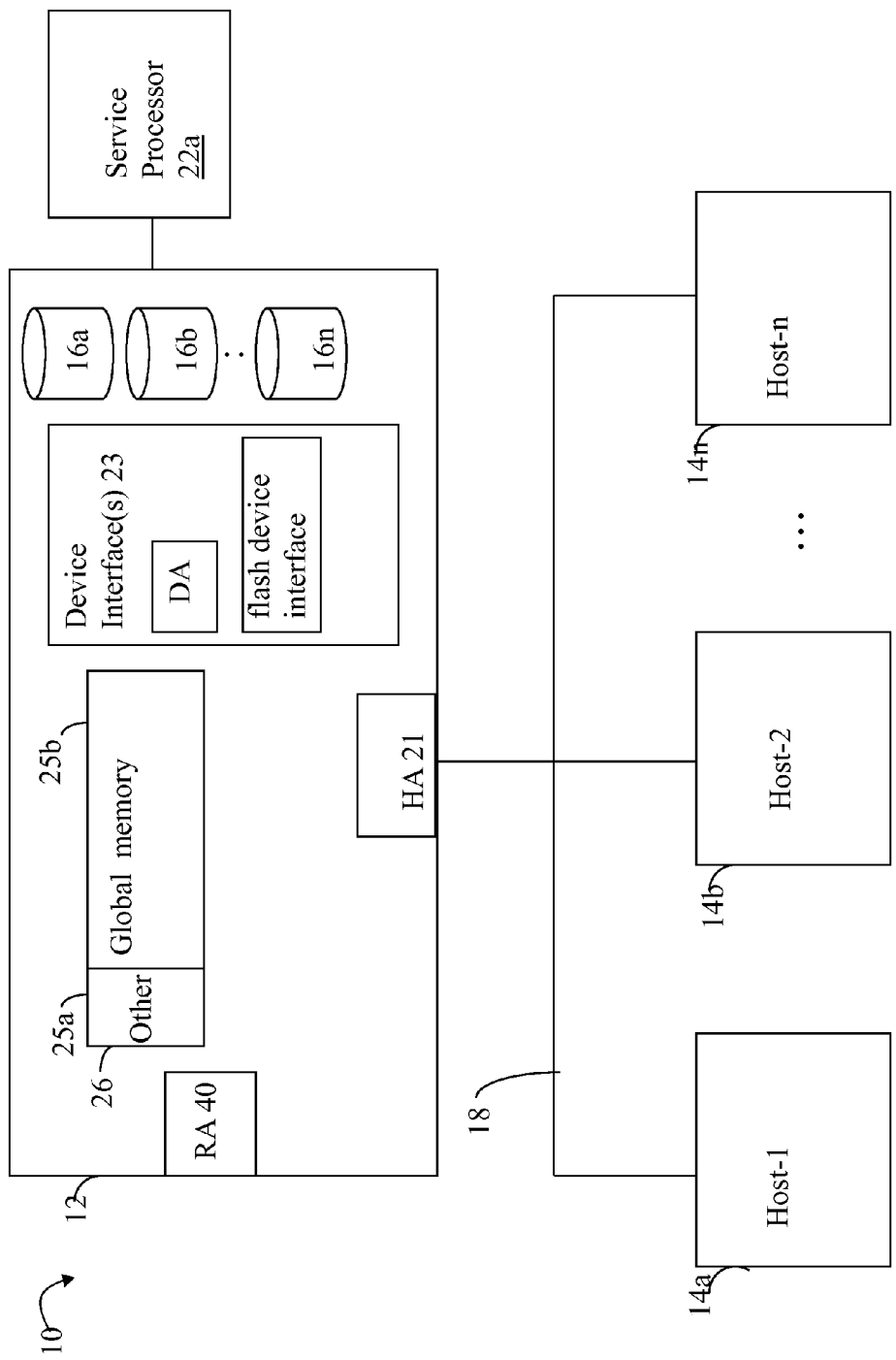
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although following paragraphs may make reference to a particular type such as a flash device or flash memory device.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical device (PD) and location on the PD. The DA which services the particular PD may further perform processing to either read data from, or write data to, the corresponding physical device location for the I/O operation.

Also shown in FIG. 1 is a service processor 22a that may be used to manage and monitor the system 12. In one embodiment, the service processor 22a may be used in collecting performance data, for example, regarding the I/O performance in connection with data storage system 12. This performance data may relate to, for example, performance measurements in connection with a data request as may be made from the different host computer systems 14a 14n. This performance data may be gathered and stored in a storage area. Alternatively, an embodiment may provide for collection of such performance data using processor(s) and other components which are internal to the data storage system.

It should be noted that a service processor 22a may exist external to the data storage system 12 and may communicate with the data storage system 12 using any one of a variety of communication connections. In one embodiment, the service processor 22a may communicate with the data storage system 12 through three different connections, a serial port, a parallel port and using a network interface card, for example, with an Ethernet connection. Using the Ethernet connection, for example, a service processor may communicate directly with DAs and HAs within the data storage system 12.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing described herein in following paragraphs as well other suitable processing.

Figure 2:
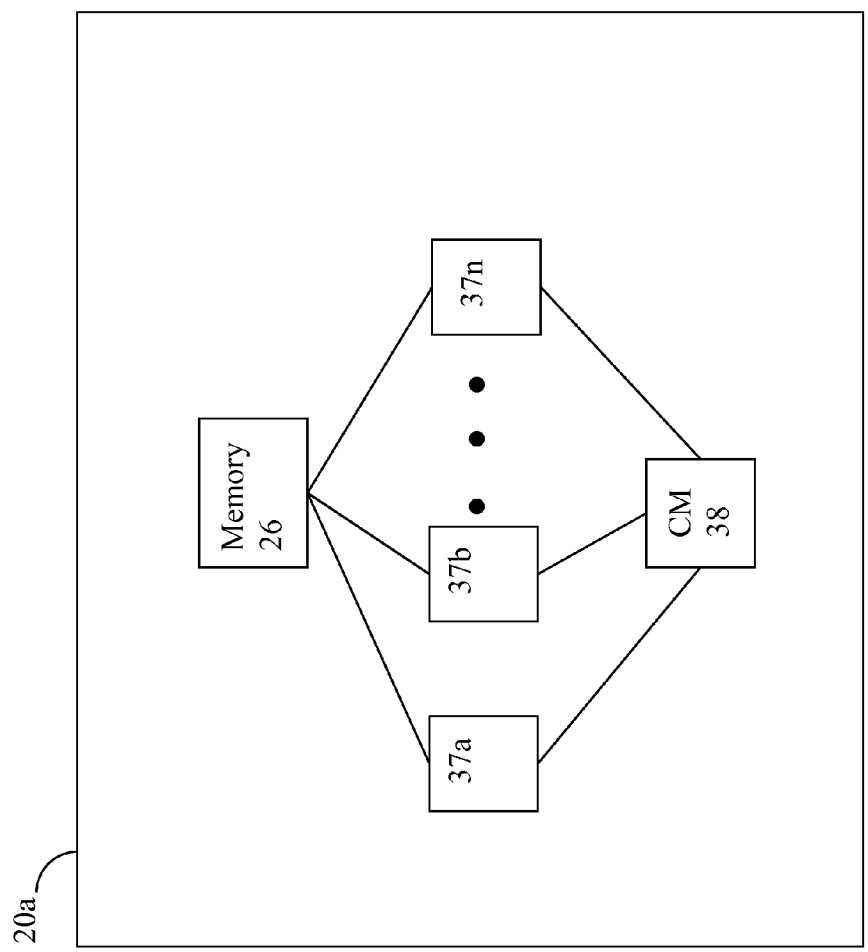
FIG. 2 is a representation of the logical internal communications between the directors and memory included in one embodiment of a data storage system of FIG. 1.

Referring to FIG. 2, shown is a representation of the logical internal communications between the directors and memory included in a data storage system. Included in FIG. 2 is a plurality of directors 37a-37n coupled to the memory 26. Each of the directors 37a-37n represents one of the HAs, RAs, or device interfaces that may be included in a data storage system. In an embodiment disclosed herein, there may be up to sixteen directors coupled to the memory 26. Other embodiments may allow a maximum number of directors other than sixteen as just described and the maximum number may vary with embodiment.

The representation of FIG. 2 also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

With reference back to FIG. 1, components of the data storage system may communicate using GM 25b. For example, in connection with a write operation, an embodiment may first store the data in cache included in a portion of GM 25b, mark the cache slot including the write operation data as write pending (WP), and then later de-stage the WP data from cache to one of the devices 16a-16n. In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

As described above, the data storage system 12 may be a data storage array including a plurality of data storage devices 16a-16n in which one or more of the devices 16a-16n are flash memory devices employing one or more different flash memory technologies. In one embodiment, the data storage system 12 may be a Symmetrix® DMX™ or VMAX™ data storage array by EMC Corporation of Hopkinton, Mass. In the foregoing data storage array, the data storage devices 16a-16n may include a combination of disk devices and flash devices in which the flash devices may appear as standard Fibre Channel (FC) drives to the various software tools used in connection with the data storage array. The flash devices may be constructed using nonvolatile semiconductor NAND flash memory. The flash devices may include one or more SLC (single level cell) devices and/or MLC (multi level cell) devices.

It should be noted that the techniques herein may be used in connection with flash devices comprising what may be characterized as enterprise-grade or enterprise-class flash drives (EFDs) with an expected lifetime (e.g., as measured in an amount of actual elapsed time such as a number of years, months, and/or days) based on a number of guaranteed write cycles, or program cycles, and a rate or frequency at which the writes are performed. Thus, a flash device may be expected to have a usage measured in calendar or wall clock elapsed time based on the amount of time it takes to perform the number of guaranteed write cycles. The techniques herein may also be used with other flash devices, more generally referred to as non-enterprise class flash devices, which, when performing writes at a same rate as for enterprise class drives, may have a lower expected lifetime based on a lower number of guaranteed write cycles.

The techniques herein may be generally used in connection with any type of flash device, or more generally, any SSD technology. The flash device may be, for example, a flash device which is a NAND gate flash device, NOR gate flash device, flash device that uses SLC or MLC technology, and the like, as known in the art. In one embodiment, the one or more flash devices may include MLC flash memory devices although an embodiment may utilize MLC, alone or in combination with, other types of flash memory devices or other suitable memory and data storage technologies. More generally, the techniques herein may be used in connection with other SSD technologies although particular flash memory technologies may be described herein for purposes of illustration.

An embodiment in accordance with techniques herein may have one or more defined storage tiers. Each tier may generally include physical storage devices or drives having one or more attributes associated with a definition for that tier. For example, one embodiment may provide a tier definition based on a set of one or more attributes. The attributes may include any one or more of a storage type or storage technology, a type of data protection, device performance characteristic(s), storage capacity, and the like. The storage type or technology may specify whether a physical storage device is an SSD drive (such as a flash drive), a particular type of SSD drive (such using flash or a form of RAM), a type of magnetic disk or other non-SSD drive (such as an FC disk drive, a SATA (Serial Advanced Technology Attachment) drive), and the like. Data protection may specify a type or level of data storage protection such, for example, as a particular RAID level (e.g., RAID1, RAID-5 3+1, RAID5 7+1, and the like). Performance characteristics may relate to different performance aspects of the physical storage devices of a particular type or technology. For example, there may be multiple types of FC disk drives based on the RPM characteristics of the FC disk drives (e.g., 10K RPM FC drives and 15K RPM FC drives) and FC disk drives having different RPM characteristics may be included in different storage tiers. Storage capacity may specify the amount of data, such as in bytes, that may be stored on the drives. An embodiment may allow a user to define one or more such storage tiers. For example, an embodiment in accordance with techniques herein may define two storage tiers including a first tier of all SSD drives and a second tier of all non-SSD drives. As another example, an embodiment in accordance with techniques herein may define three storage tiers including a first tier of all SSD drives which are flash drives, a second tier of all FC drives, and a third tier of all SATA drives. The foregoing are some examples of tier definitions and other tier definitions may be specified in accordance with techniques herein.

Figure 3:
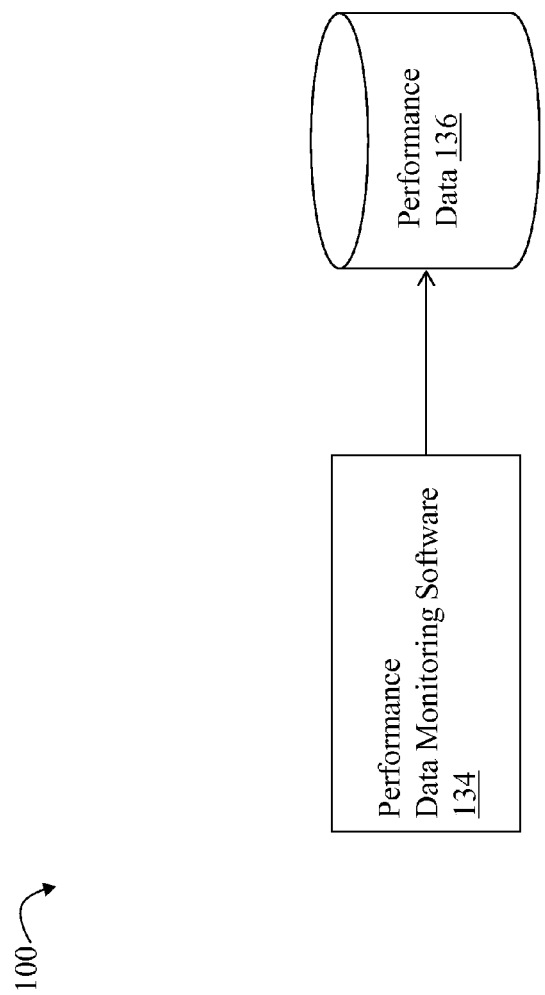
FIG. 3 is an example representing components that may be used in an embodiment in accordance with techniques herein.

Referring to FIG. 3, shown is an example 100 of components that may be used in an embodiment in connection with techniques herein. The example 100 includes performance data monitoring software 134 which gathers performance data about the data storage system. The software 134 may gather and store performance data 136. This performance data 136 may also serve as an input to other software, such as used in connection with performing data storage system optimizations, which attempt to enhance the performance of I/O operations, such as those I/O operations associated with data storage devices 16a-16n of the system 12 (as in FIG. 1). The performance data 136 may be used in determining a workload for one or more physical devices, a pool or group of physical devices, logical devices or volumes (e.g., LUNs), thin or virtually provisioned devices (described in more detail elsewhere herein), portions of thin devices, and the like. The workload may also be a measurement or level of "how busy" a device is, for example, in terms of I/O operations (e.g., I/O throughput such as number of I/Os/second, response time (RT), and the like).

The response time (RT) for a logical or physical storage device or volume may be based on a response time associated with the logical or physical storage device or volume for a period of time. The response time may based on read and write operations directed to the storage device or volume. Response time represents the amount of time it takes the storage system to complete an I/O request (e.g., a read or write request). Response time may be characterized as including two components: service time and wait time. Service time is the actual amount of time spent servicing or completing an I/O request after receiving the request from a host via an HA 21, or after the storage system 12 generates the I/O request internally. The wait time is the amount of time the I/O request spends waiting in line or queue waiting for service (e.g., prior to executing the I/O operation).

It should be noted that the operations of read and write with respect to a LUN, thin device, and the like, may be viewed as read and write requests or commands from the DA 23, controller or other backend physical device interface. Thus, these are operations may also be characterized as a number of operations with respect to the physical storage device (e.g., number of physical device reads, writes, and the like, based on physical device accesses). This is in contrast to observing or counting a number of particular types of I/O requests (e.g., reads or writes) as issued from the host and received by a front end component such as an HA 21. To illustrate, a host read request may not result in a read request or command issued to the DA if there is a cache hit and the requested data is in cache. The host read request results in a read request or command issued to the DA 23 to retrieve data from the physical drive only if there is a read miss. Furthermore, when writing data of a received host I/O request to the physical device, the host write request may result in multiple reads and/or writes by the DA 23 in addition to writing out the host or user data of the request. For example, if the data storage system implements a RAID data protection technique, such as RAID-5, additional reads and writes may be performed such as in connection with writing out additional parity information for the user data. Thus, observed data gathered to determine workload, such as observed numbers of reads and writes, may refer to the back-end read and write requests or commands performed by the DA. Such read and write commands may correspond, respectively, to physical device accesses such as disk reads and writes that may result from a host I/O request received by an HA 21.

In an exemplary embodiment of a multi-tiered storage system, the techniques herein may be described with reference to a storage environment having three storage tiers—a first tier of only SSD or flash drives in the data storage system, a second tier of only FC disk drives, and a third tier of only SATA disk drives. In terms of performance, the foregoing three tiers may be ranked from highest to lowest as follows: first, second, and then third. The lower the tier ranking, the lower the tier's performance characteristics (e.g., longer latency times, capable of less I/O throughput/second/GB (or other storage unit), and the like). Generally, different types of physical devices or physical drives have different types of characteristics. There are different reasons why one may want to use one storage tier and type of drive over another depending on criteria, goals and the current performance characteristics exhibited in connection with performing I/O operations. For example, flash drives of the first tier may be a best choice or candidate for storing data which may be characterized as I/O intensive or "busy" thereby experiencing a high rate of I/Os to frequently access the physical storage device containing the LUN's data. However, flash drives tend to be expensive in terms of storage capacity. SATA drives may be a best choice or candidate for storing data of devices requiring a large storage capacity and which are not I/O intensive with respect to access and retrieval from the physical storage device. The second tier of FC disk drives may be characterized as "in between" flash drives and SATA drives in terms of cost/GB and I/O performance. Thus, in terms of relative performance characteristics, flash drives may be characterized as having higher performance than both FC and SATA disks, and FC disks may be characterized as having a higher performance than SATA.

Since flash drives of the first tier are the best suited for high throughput/sec/GB, processing may be performed to determine which of the devices, and data portions thereof, are characterized as most I/O intensive and therefore may be good candidates to have their data stored on flash drives. Similarly, the second most I/O intensive devices, and portions thereof, may be good candidates to store on FC disk drives of the second tier and the least I/O intensive devices may be good candidates to store on SATA drives of the third tier. As such, workload for an application may be determined using some measure of I/O intensity, performance or activity (e.g., I/O throughput/second, percentage of read operation, percentage of write operations, response time, etc.) of each device used for the application's data. Some measure of workload may be used as a factor or criterion in combination with others described herein for determining what data portions are located on the physical storage devices of each of the different storage tiers.

Figure 4:
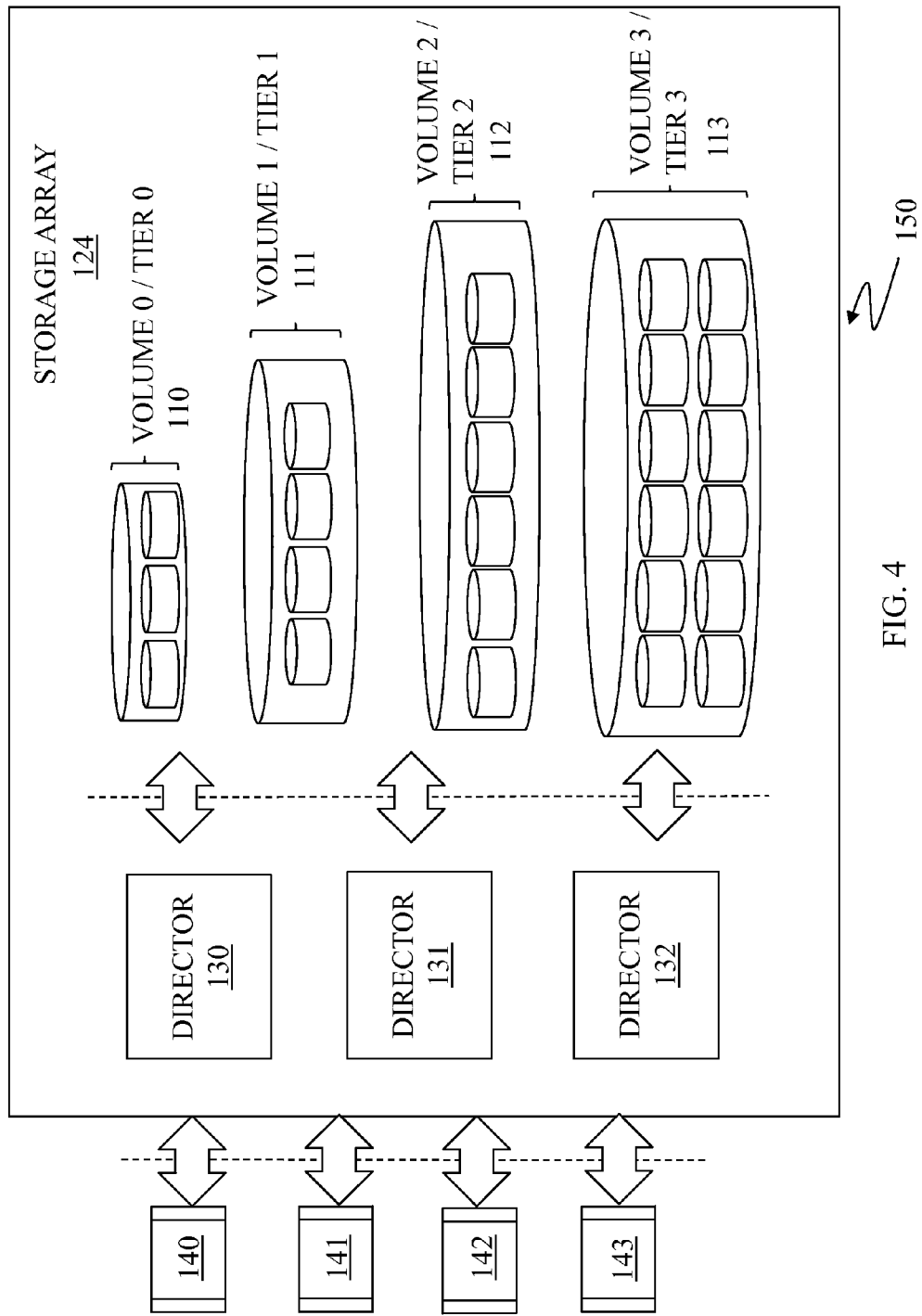
FIGS. 4, 5A and 5B are examples illustrating a data storage system, such as data storage array, including a plurality of storage tiers in an embodiment in accordance with techniques herein.

FIG. 4 is a schematic illustration showing a storage system 150 that may be used in connection with an embodiment of the system described herein. The storage system 150 may include a storage array 124 having multiple directors 130-132 and multiple storage volumes (logical devices, LUNs, or VOLUMES 0-3) 110-113. Host applications 140-144 and/or other entities (e.g., other storage devices, SAN switches, etc.) request data writes and data reads to and from the storage array 124 that are facilitated using one or more of the directors 130-132. The storage array 124 may include similar features as that discussed above.

The volumes 110-113 may be provided in multiple storage tiers (TIERS 0-3) that may have different storage characteristics, such as speed, cost, reliability, availability, security and/or other characteristics. As described above, a tier may represent a set of storage resources, such as physical storage devices, residing in a storage platform. Examples of storage disks that may be used as storage resources within a storage array of a tier may include sets SATA disks, FC disks and/or EFDs, among other known types of storage devices.

According to various embodiments, each of the volumes 110-113 (as well as data portions of a single volume) may be located in different storage tiers. Tiered storage provides that data may be initially allocated to a particular fast volume/tier, but a portion of the data that has not been used over a period of time may be automatically moved to a slower (and perhaps less expensive) tier. For example, data that is expected to be used frequently, for example database indices, may be initially written directly to fast storage whereas data that is not expected to be accessed frequently may be initially written to slower storage. In an embodiment, the system described herein may be used in connection with a Fully Automated Storage Tiering (FAST) product produced by EMC Corporation of Hopkinton, Mass., that provides for the optimization of the use of different storage tiers including the ability to easily create and apply tiering policies (e.g., allocation policies, data movement policies including promotion and demotion thresholds, and the like) to transparently automate the control, placement, and movement of data within a storage system based on business needs.

Figure 5A:
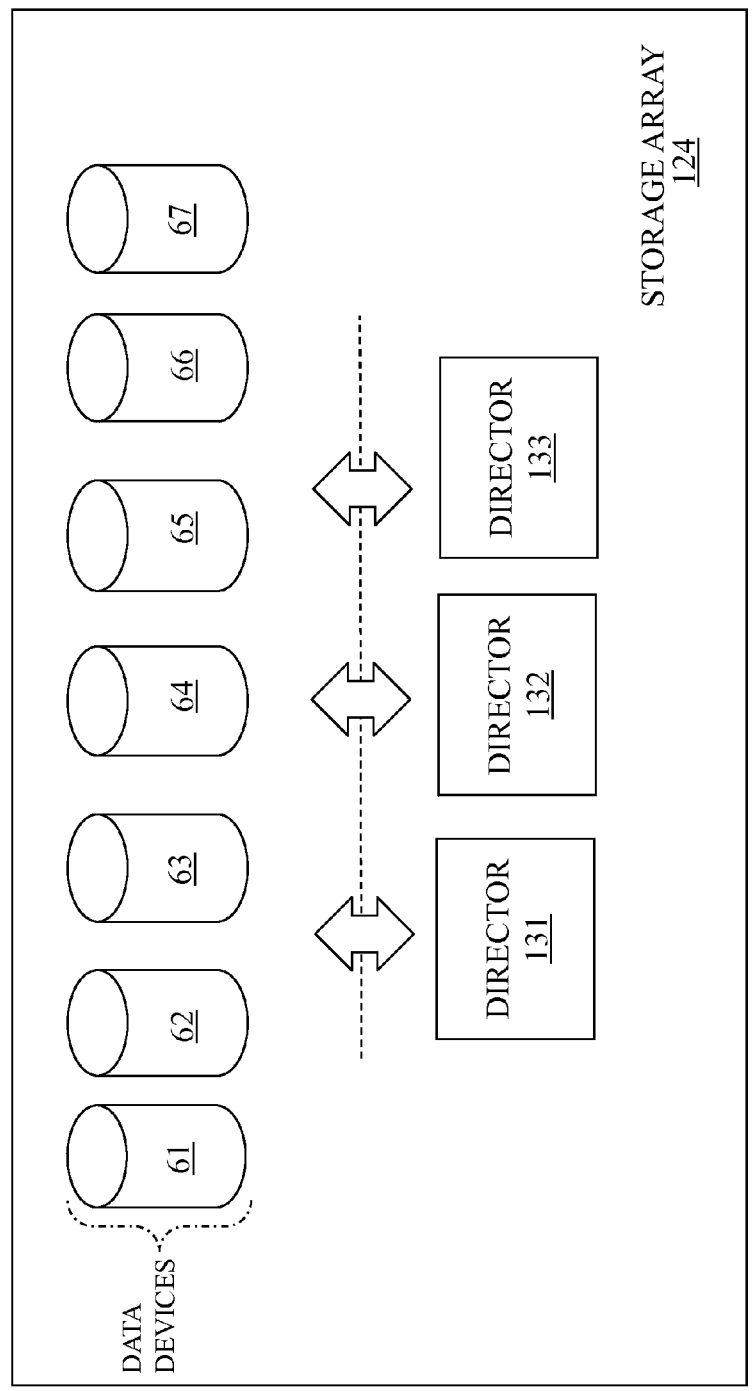

Referring to FIG. 5A, shown is a schematic diagram of the storage array 124 as including a plurality of data devices 61-67 communicating with directors 131-133. The data devices 61-67 may be implemented as logical devices like standard logical devices (e.g., such as thick devices) provided in a Symmetrix® data storage device produced by EMC Corporation of Hopkinton, Mass., for example. In some embodiments, the data devices 61-67 may not be directly useable (visible) to hosts coupled to the storage array 124. Each of the data devices 61-67 may correspond to a portion (including a whole portion) of one or more of the disk drives 42-44 (or more generally physical devices). Thus, for example, the data device section 61 may correspond to the disk drive 42, may correspond to a portion of the disk drive 42, or may correspond to a portion of the disk drive 42 and a portion of the disk drive 43. The data devices 61-67 may be designated as corresponding to different classes, so that different ones of the data devices 61-67 correspond to different physical storage having different relative access speeds or RAID protection type (or some other relevant distinguishing characteristic or combination of characteristics), as further discussed elsewhere herein. Alternatively, in other embodiments that may be used in connection with the system described herein, instead of being separate devices, the data devices 61-67 may be sections of one data device.

Figure 5B:
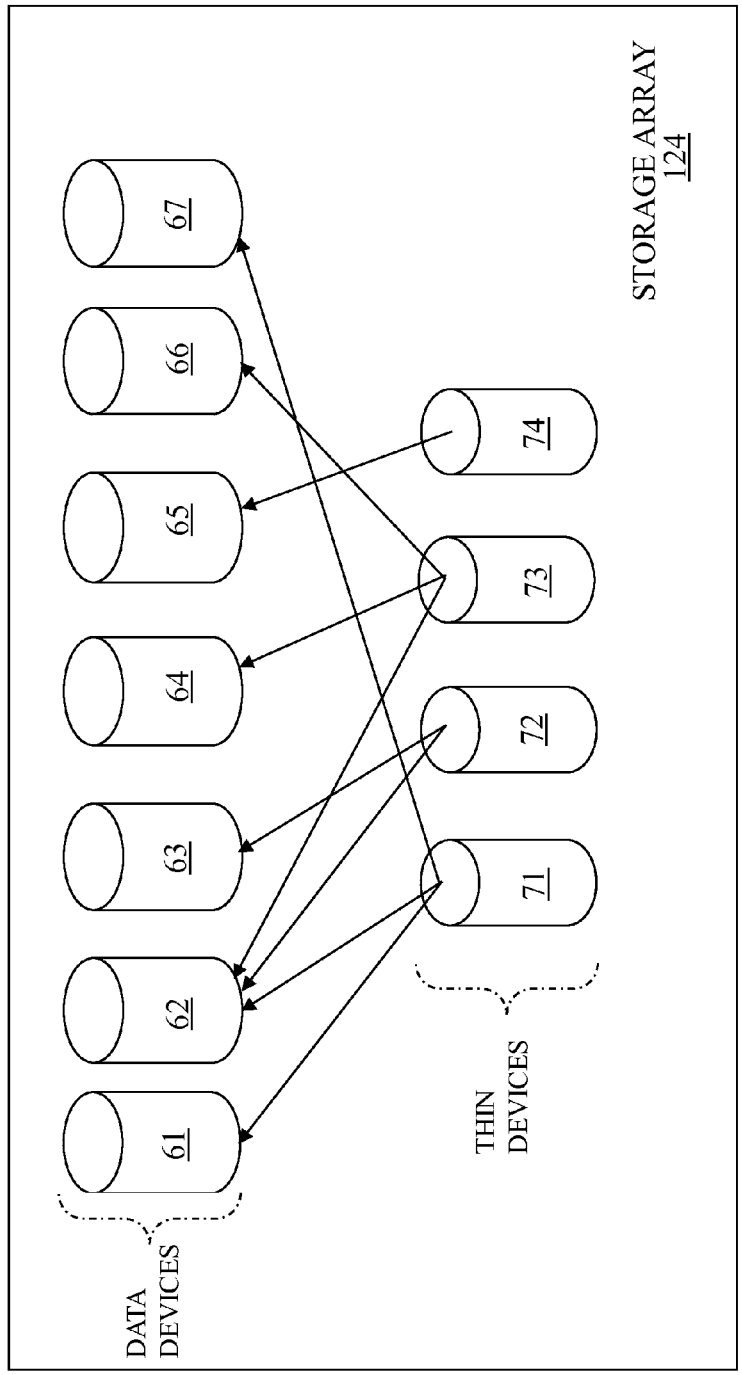

As shown in FIG. 5B, the storage array 124 may also include a plurality of thin devices 71-74 that may be adapted for use in connection with the system described herein when using thin provisioning. In a system using thin provisioning, the thin devices 71-74 may appear to a host coupled to the storage array 124 as one or more logical volumes (logical devices) containing contiguous blocks of data storage. Each of the thin devices 71-74 may contain pointers to some or all of the data devices 61-67 (or portions thereof). As described in more detail elsewhere herein, a thin device may be virtually provisioned in terms of its allocated physical storage in physical storage for a thin device presented to a host as having a particular capacity is allocated as needed rather than allocate physical storage for the entire thin device capacity upon creation of the thin device. As such, a thin device presented to the host as having a capacity with a corresponding LBA (logical block address) range may have portions of the LBA range for which storage is not allocated.

Figure 5C:
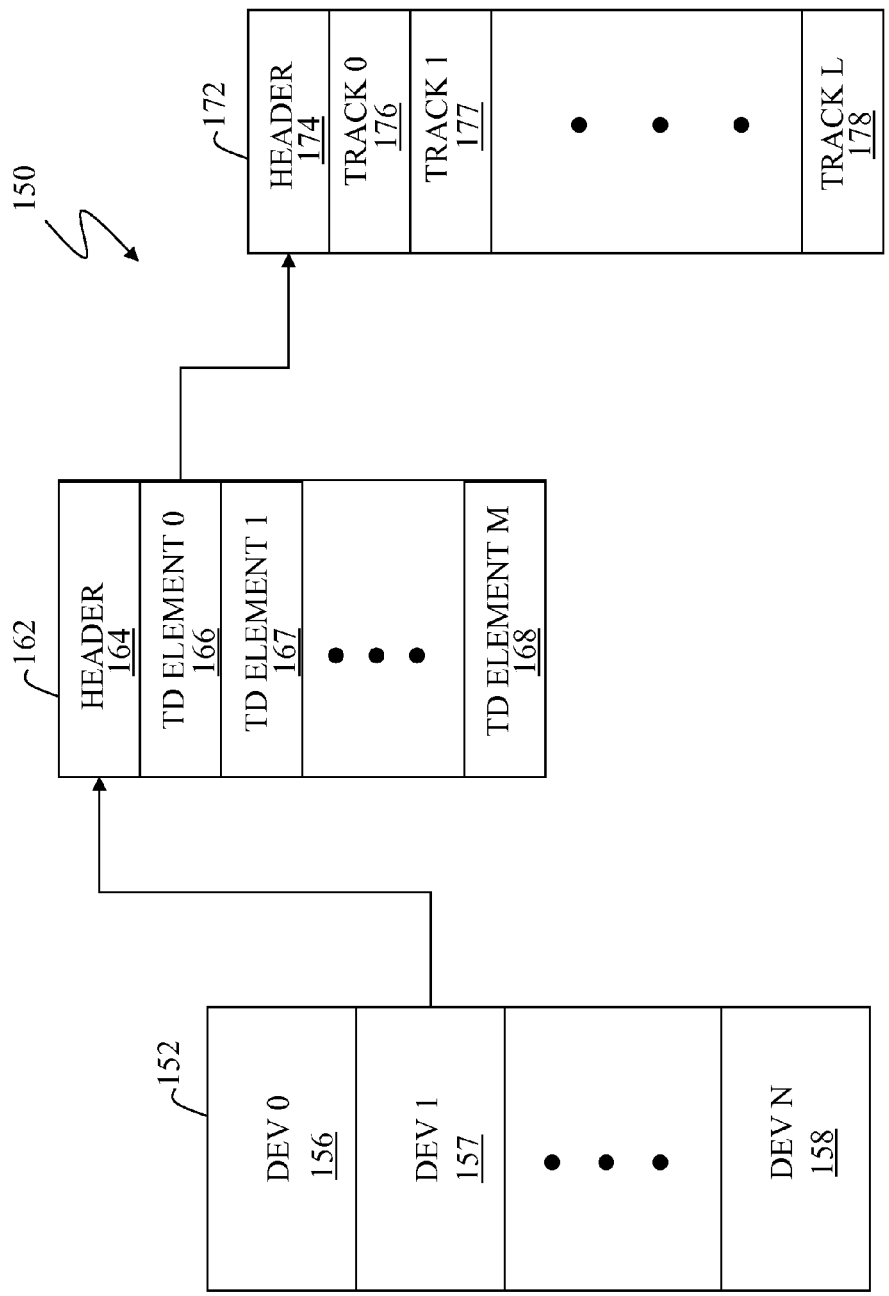
FIG. 5C is a schematic diagram illustrating tables that are used to keep track of device information in connection with an embodiment of the system described herein.

Referring to FIG. 5C, shown is a diagram 150 illustrating tables that are used to keep track of device information. A first table 152 corresponds to all of the devices used by a data storage system or by an element of a data storage system, such as an HA 21 and/or a DA 23. The table 152 includes a plurality of logical device (logical volume) entries 156-158 that correspond to all the logical devices used by the data storage system (or portion of the data storage system). The entries in the table 152 may include information for thin devices, for data devices (such as logical devices or volumes), for standard logical devices, for virtual devices, for BCV devices, and/or any or all other types of logical devices used in connection with the system described herein.

Each of the entries 156-158 of the table 152 correspond to another table that may contain information for one or more logical volumes, such as thin device logical volumes. For example, the entry 157 may correspond to a thin device table 162. The thin device table 162 may include a header 164 that contains overhead information, such as information identifying the corresponding thin device, information concerning the last used data device and/or other information including counter information, such as a counter that keeps track of used group entries (described below). The header information, or portions thereof, may be available globally to the data storage system.

The thin device table 162 may include one or more group elements 166-168, that contain information corresponding to a group of tracks on the data device. A group of tracks may include one or more tracks, the number of which may be configured as appropriate. In an embodiment herein, each group has sixteen tracks, although this number may be configurable.

One of the group elements 166-168 (for example, the group element 166) of the thin device table 162 may identify a particular one of the data devices 61-67 having a track table 172 that contains further information, such as a header 174 having overhead information and a plurality of entries 176-178 corresponding to each of the tracks of the particular one of the data devices 61-67. The information in each of the entries 176-178 may include a pointer (either direct or indirect) to the physical address on one of the physical disk drives of the data storage system that maps to the logical address(es) of the particular one of the data devices 61-67. Thus, the track table 162 may be used in connection with mapping logical addresses of the logical devices corresponding to the tables 152, 162, 172 to physical addresses on the disk drives or other physical devices of the data storage system.

The tables 152, 162, 172 may be stored in the global memory 25b of the data storage system. In addition, the tables corresponding to particular logical devices accessed by a particular host may be stored (cached) in local memory of the corresponding one of the HA's. In addition, an RA and/or the DA's may also use and locally store (cache) portions of the tables 152, 162, 172.

Figure 5D:
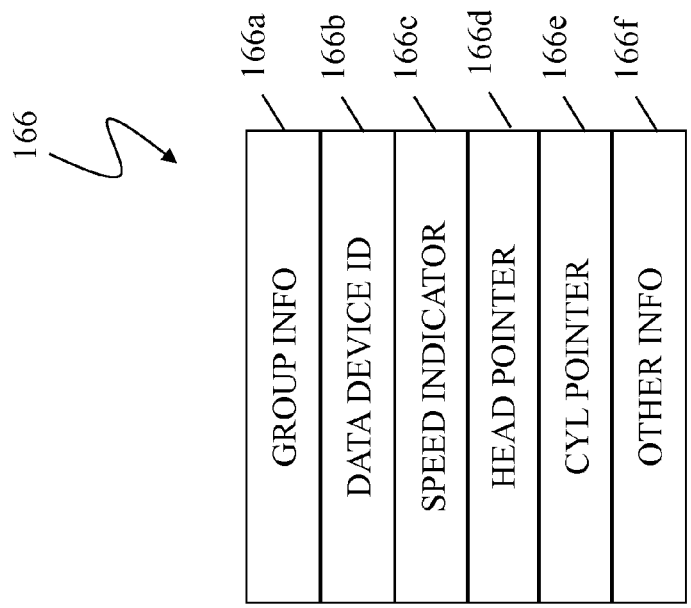
FIG. 5D is a schematic diagram showing a group element of a thin device table in connection with an embodiment of the system described herein.

Referring to FIG. 5D, shown is a schematic diagram illustrating a group element 166 of the thin device table 162 in connection with an embodiment of the system described herein. The group element 166 may includes a plurality of entries 166a-166f. The entry 166a may provide group information, such as a group type that indicates whether there has been physical address space allocated for the group. The entry 166b may include information identifying one (or more) of the data devices 61-67 that correspond to the group (i.e., the one of the data devices 61-67 that contains pointers for physical data for the group). The entry 166c may include other identifying information for the one of the data devices 61-67, including a speed indicator that identifies, for example, if the data device is associated with a relatively fast access physical storage (disk drive) or a relatively slow access physical storage (disk drive). Other types of designations of data devices are possible (e.g., relatively expensive or inexpensive). The entry 166d may be a pointer to a head of the first allocated track for the one of the data devices 61-67 indicated by the data device ID entry 166b. Alternatively, the entry 166d may point to header information of the data device track table 172 immediately prior to the first allocated track. The entry 166e may identify a cylinder of a first allocated track for the one the data devices 61-67 indicated by the data device ID entry 166b. The entry 166f may contain other information corresponding to the group element 166 and/or the corresponding thin device. In other embodiments, entries of the group table 166 may identify a range of cylinders of the thin device and a corresponding mapping to map cylinder/track identifiers for the thin device to tracks/cylinders of a corresponding data device. In an embodiment, the size of table element 166 may be eight bytes.

Accordingly, a thin device presents a logical storage space to one or more applications running on a host where different portions of the logical storage space may or may not have corresponding physical storage space associated therewith. However, the thin device is not mapped directly to physical storage space. Instead, portions of the thin storage device for which physical storage space exists are mapped to data devices, which are logical devices that map logical storage space of the data device to physical storage space on the disk drives or other physical storage devices. Thus, an access of the logical storage space of the thin device results in either a null pointer (or equivalent) indicating that no corresponding physical storage space has yet been allocated, or results in a reference to a data device which in turn references the underlying physical storage space.

Thin devices and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, and U.S. Pat. No. 7,949,637, Issued May 24, 2011, Storage Management for Fine Grained Tiered Storage with Thin Provisioning, to Burke, both of which are incorporated by reference herein.

As discussed elsewhere herein, the data devices 61-67 (and other logical devices) may be associated with physical storage areas (e.g., disk drives, tapes, solid state storage, etc.) having different characteristics. In various embodiments, the physical storage areas may include multiple tiers of storage in which each sub-tier of physical storage areas and/or disk drives may be ordered according to different characteristics and/or classes, such as speed, technology and/or cost. The data devices 61-67 may or may not appear to a host coupled to the storage array 124 as a logical volumes (logical devices) containing a contiguous block of data storage, as discussed herein. Accordingly, each of the data devices 61-67 may map to storage areas across multiple physical storage drives. The granularity at which the storage system described herein operates may be smaller than at the file level, for example potentially as small as a single byte, but more practically at the granularity of a single logical block or collection of sequential data blocks. A data block may be of any size including file system or database logical block size, physical block, track or cylinder and/or other size. Multiple data blocks may be substantially the same size or different sizes, such as different size data blocks for different storage volumes or different sized data blocks within a single storage volume.

In accordance with techniques herein, an embodiment may allow for locating all of the data of a single logical portion or entity in a same tier or in multiple different tiers depending on the logical data portion or entity. In an embodiment including thin devices, the techniques herein may be used where different portions of data of a single thin device may be located in different storage tiers. For example, a thin device may include two data portions and a first of these two data portions may be identified as a "hot spot" of high I/O activity (e.g., having a large number of I/O accesses such as reads and/or writes per unit of time) relative to the second of these two portions. As such, an embodiment in accordance with techniques herein may have added flexibility in that the first portion of data of the thin device may be located in a different higher performance storage tier than the second portion. For example, the first portion may be located in a tier comprising flash devices and the second portion may be located in a different tier of FC or SATA drives.

Data used in connection with techniques herein, such as the performance data of FIG. 3 used in determining response time and/or other performance metrics for physical device(s), may be obtained through observation and monitoring actual performance with respect to read and write requests or commands from the DA, controller or other backend physical device interface.

It should be noted that movement of data between tiers from a source tier to a target tier may include determining free or unused storage device locations within the target tier. In the event there is an insufficient amount of free of unused storage in the target tier, processing may also include displacing or relocating other data currently stored on a physical device of the target tier. An embodiment may perform movement of data to and/or from physical storage devices using any suitable technique. Also, any suitable technique may be used to determine a target storage device in the target tier where the data currently stored on the target is relocated or migrated to another physical device in the same or a different tier.

One embodiment in accordance with techniques herein may include multiple storage tiers including a first tier of flash devices and one or more other tiers of non-flash devices having lower performance characteristics than flash devices. The one or more other tiers may include, for example, one or more types of disk devices. The tiers may also include other types of SSDs besides flash devices.

As described above, a thin device (also referred to as a virtually provisioned device) is a device that represents a certain capacity having an associated address range. Storage may be allocated for thin devices in chunks or data portions of a particular size as needed rather than allocate all storage necessary for the thin device's entire capacity. Therefore, it may be the case that at any point in time, only a small number of portions or chunks of the thin device actually are allocated and consume physical storage on the back end (on physical disks, flash or other physical storage devices). A thin device may be constructed of chunks having a size that may vary with embodiment. For example, in one embodiment, a chunk may correspond to a group of 12 tracks (e.g., 12 tracks*64 Kbytes/track=768 Kbytes/chunk). As also noted with a thin device, the different chunks may reside on different data devices in one or more storage tiers. In one embodiment, as will be described below, a storage tier may consist of one or more storage pools. Each storage pool may include multiple logical devices which are data devices and their associated physical devices. With thin devices, a system in accordance with techniques herein has flexibility to relocate individual chunks as desired to different devices in the same as well as different pools or storage tiers. For example, a system may relocate a chunk from a flash storage pool to a SATA storage pool. In one embodiment using techniques herein, a thin device can be bound to a particular storage pool of a storage tier at a point in time so that any chunks requiring allocation of additional storage, such as may occur when writing data to the thin device, result in allocating storage from this storage pool. Such binding may change over time for a thin device.

Figure 6A:
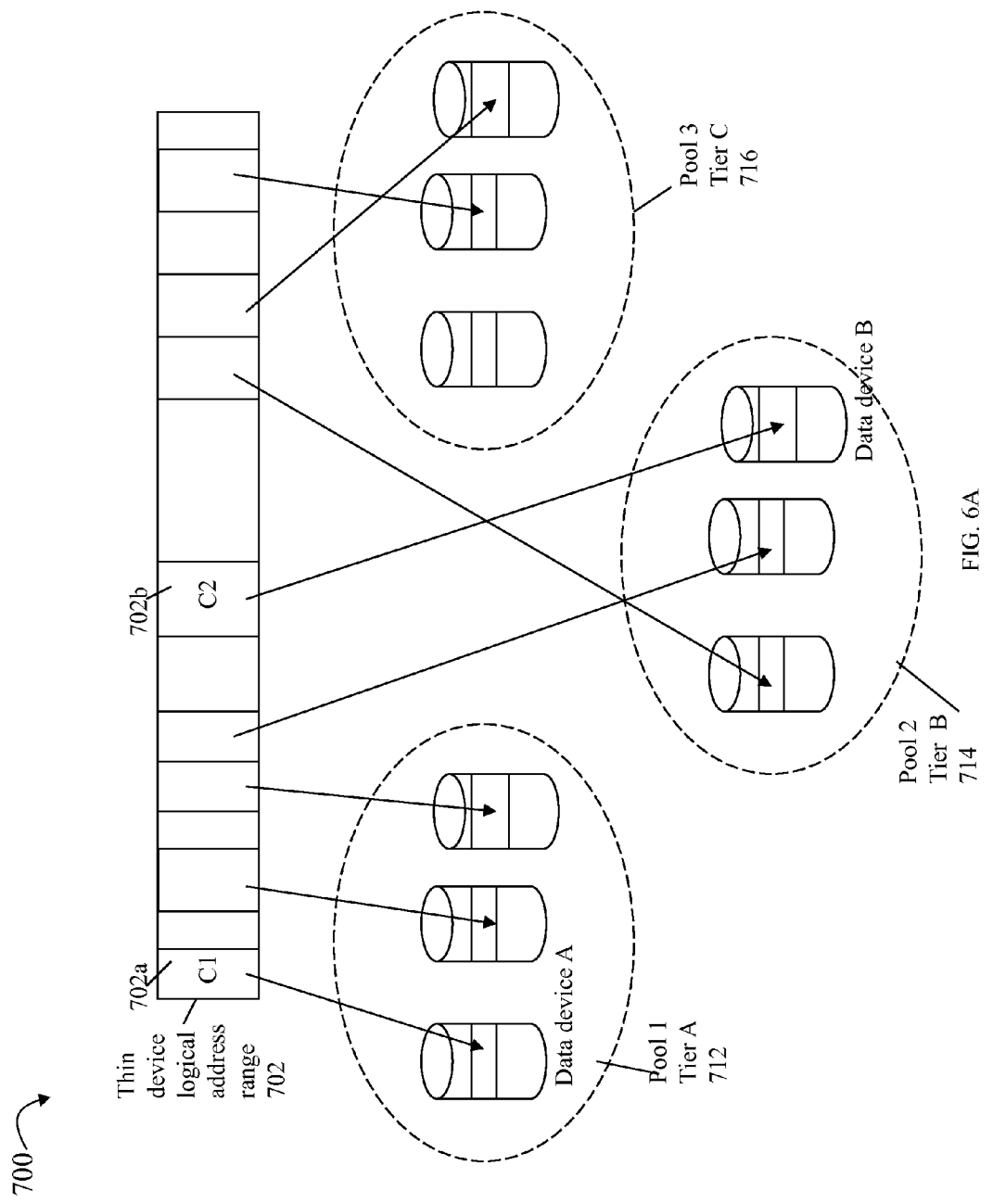
FIGS. 6A and 6B are examples illustrating thin devices and associated structures that may be used in an embodiment in accordance with techniques herein.

Referring to FIG. 6A, shown is an example 700 illustrating use of a thin device in an embodiment in accordance with techniques herein. The example 700 includes three storage pools 712, 714 and 716 with each such pool representing a storage pool of a different storage tier. For example, pool 712 may represent a storage pool of tier A of flash storage devices, pool 714 may represent a storage pool of tier B of FC storage devices, and pool 716 may represent a storage pool of tier C of SATA storage devices. Each storage pool may include a plurality of logical devices (which are data devices) and associated physical devices (or portions thereof) to which the logical devices are mapped. Element 702 represents the thin device address space or range including chunks which are mapped to different storage pools. For example, element 702a denotes a chunk C1 which is mapped to storage pool 712 and element 702b denotes a chunk C2 which is mapped to storage pool 714. Element 702 may be a representation for a first thin device which is included in a storage group of one or more thin devices.

It should be noted that although the example 700 illustrates only a single storage pool per storage tier, an embodiment may also have multiple storage pools per tier.

Figure 6B:
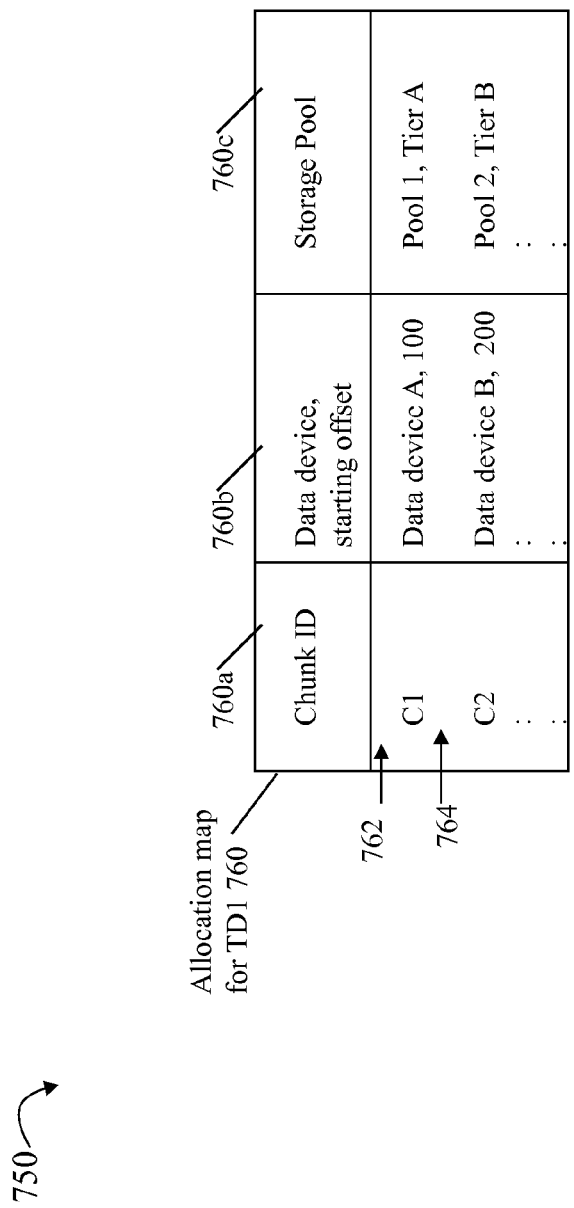

Referring to FIG. 6B, shown is an example representation of information that may be included in an allocation map in an embodiment in accordance with techniques herein. An allocation map may be used to identify the mapping for each thin device (TD) chunk (e.g. where each chunk is physically located). Element 760 represents an allocation map that may be maintained for each TD. In this example, element 760 represents information as may be maintained for a single TD although another allocation map may be similarly used and maintained for each other TD in a storage group. Element 760 may represent mapping information as illustrated in FIG. 6A such as in connection the mapping of 702 to different storage pool devices. The allocation map 760 may contain an entry for each chunk and identify which logical device or data device and associated physical storage is mapped to the chunk. For each entry or row of the map 760 corresponding to a chunk, a first column 760a, Chunk ID, denotes an identifier to uniquely identify the chunk of the TD, a second column 760b, indicates information about the data device and offset to which the chunk is mapped, and a third column storage pool 760c denotes the storage pool and tier including the data device of 760b. For example, entry 762 represents chunk C1 illustrated in FIG. 6A as 702a and entry 764 represents chunk C2 illustrated in FIG. 6A as 702b. It should be noted that although not illustrated, the allocation map may include or otherwise use other tables and structures which identify a further mapping for each data device such as which physical device locations map to which data devices. This further mapping for each data device, as well as other logical devices generally, is described and illustrated elsewhere herein such as, for example, with reference back to FIG. 5B. Such information as illustrated and described in connection with FIG. 6B may be maintained for each thin device in an embodiment in accordance with techniques herein.

In connection with performing I/O operations, such as writes as well as reads, a data storage system in an embodiment in accordance with techniques herein may use a cache in order to improve performance.

Figure 7:
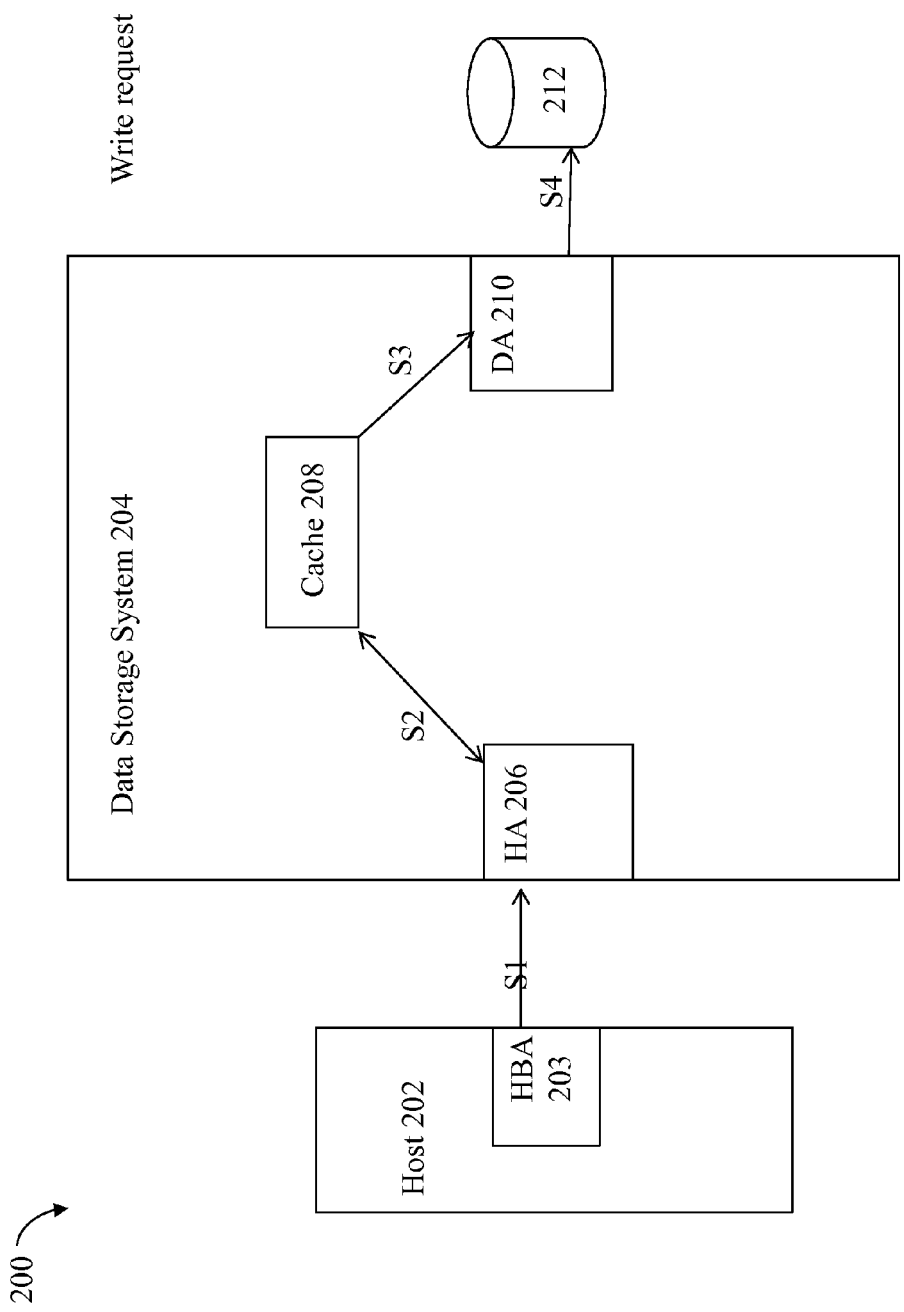
FIGS. 7 and 8 are examples illustrating processing that may be performed in connection servicing I/O operations on the data storage system in an embodiment in accordance with techniques herein.

Referring to FIG. 7, shown is an example illustrating processing of a write I/O operation received at the data storage system in an embodiment in accordance with techniques herein, whereby a host may issue the write operation. The example 200 includes host 202 and data storage system 204. The host 202 includes host bus adapter (HBA) 203 having one or more ports used for communicating with the data storage system 204. The data storage system 204 includes a front end component, HA 206, which receives I/Os from the host 202. The data storage system 204 also includes DA 210, cache 208 and physical storage device 212, such as a disk drive. Generally, the host 202 and data storage system 204 may include components as described in more detail in connection with other figures herein. Details of other components of 202, 204, and connections therebetween, have been omitted for simplicity of illustration. The cache 208 may be a global cache used by and between the different components of the system 204, such as by the HAs, DAs, and other components of the system 204 as described herein. Thus, data in the cache 208 may be read from, and/or written to, by different components of the system 204 such as for use with techniques herein as well as other purposes that may vary with embodiment. In one embodiment such as illustrated in the example 200, the cache 208 may be a portion of global memory of the data storage system 204.

In step S1, the host 202 may issue a write request over a port of its HBA 203 where the write request is received by the HA 206 of the data storage system 204. In a step S2, the HA 206 may store the write operation data in cache 208 and mark the cache slot or cache location as write pending (WP) thereby denoting the cache slot includes write data that needs to be written to physical storage. In some embodiments, the data storage system may return a response to the host indicating that the write operation has been completed successfully following S2 once the write data has been stored in the cache 208. Once the write data has been stored in cache 208 in step S2, processing may be performed at some time later to destage the write data from cache 208 to the physical drive 212. Thus, in a step S3, the DA 210 may obtain the write data from cache 208 and then store the write data in step S4 at the appropriate location on the physical device 212. Although not described herein and as will be appreciated by those skilled in the art, other processing may be performed in connection with processing the write operation such as, for example, setting the cache slot location to no longer indicate WP once the write data is written to physical storage in step S4.

Figure 8:
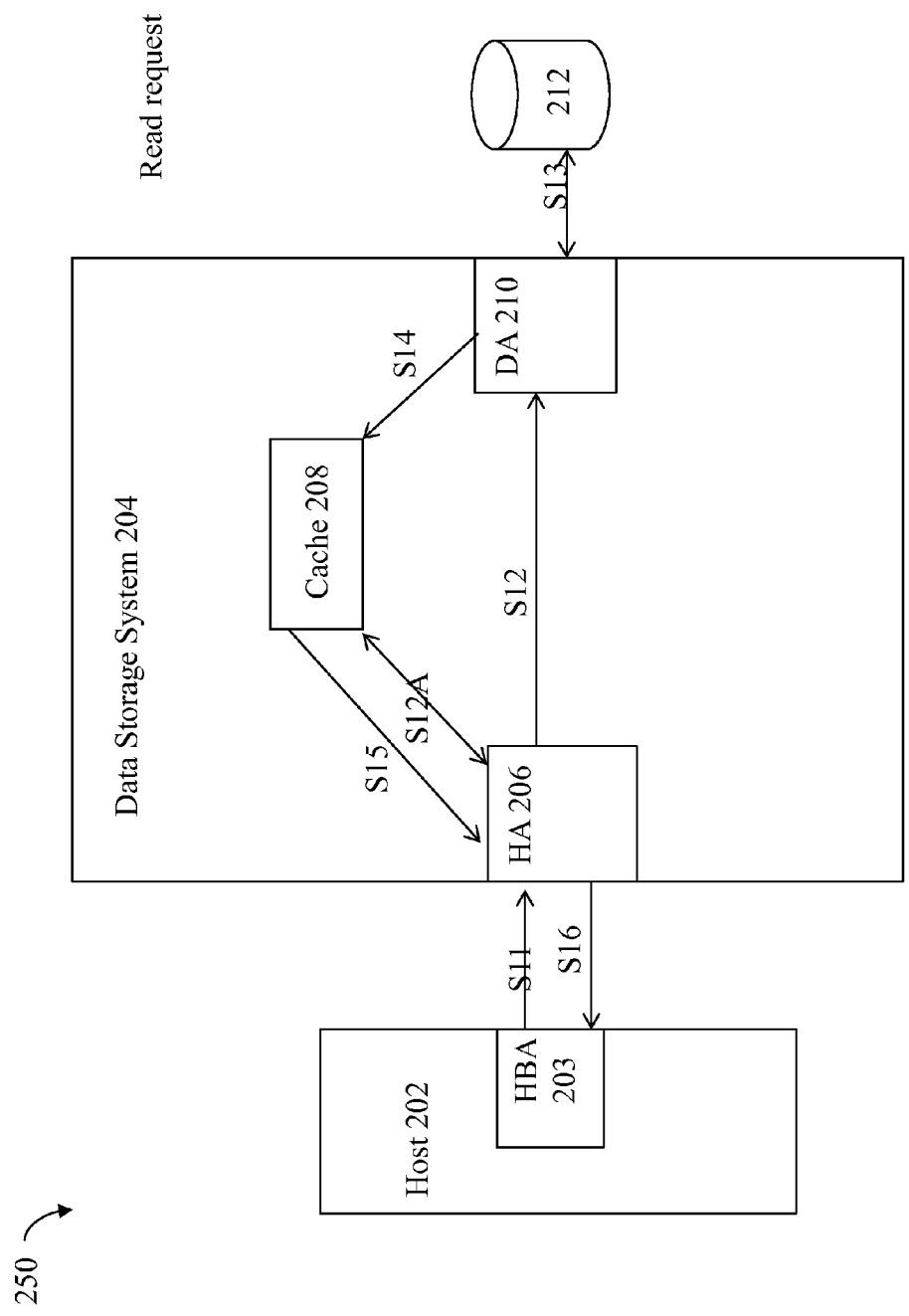

Referring to FIG. 8, shown is an example illustrating processing of a read I/O operation received at the data storage system, in an embodiment in accordance with techniques herein, whereby a host may issue the read operation. The example 250 includes host 202, data storage system 204, and components similarly numbered and as described elsewhere herein.

As a first step S11, the host 202 sends the read request to the data storage system 204. The read request may be received by HA 206. The HA 206 determines whether all the requested read data is in cache 208 thereby indicating that the read request is a read hit, or otherwise, that the read request is a read miss. If the read request is a read hit indicating that the read request may be serviced using data already in cache 208, the HA 206 retrieves the read request data from the cache 208 in step S12A and returns the requested read data to the host 202 in step S16. Alternatively, if the read request is a read miss, processing may be performed to retrieve the data from physical storage, store the requested read data in cache, and then return the cached read data to the host. In connection with read miss processing, the HA 206 may request S12 that a back-end component, such as the DA 210, retrieve the requested data from physical storage device 212. It should be noted that in performing S12, whereby the HA 206 issues the request for the DA 210 to retrieve the requested read data, such a request may be communicated or issued to the DA 210, directly or indirectly, in any suitable manner that may vary with the embodiment of the data storage system. For example, the request may be communicated indirectly, such as through global memory, communicated directly from the HA to the DA such as a through a messaging layer and associated fabric, and the like. In any case, the DA 210 retrieves the requested read data from physical storage device 212 in step S13. The DA 210 may store the read data in cache 208 in step S14. The HA 206 may then retrieve the read data in step S5 from the cache 208 and then return the requested read data (as retrieved from cache) to the host 202 in step S16.

It should be noted that processing of a read operation in an embodiment in accordance with techniques herein may also be performed using other processing than as illustrated in FIG. 8. For example, host read operations may be processed as described, for example, in U.S. patent application Ser. No. 13/875,490, filed May 2, 2013, entitled TECHNIQUES USING CACHELESS READ AND DEFERRED CACHING, which is incorporated by reference herein.

It should be noted that although only a single host has been described and illustrated, such as in connection with examples 200 and 250, the data storage system may be servicing I/O operations from multiple hosts and multiple applications executing on such hosts whereby each of the applications may have a different workload. The workload of each application may vary, for example, in terms mixture or percentage of I/O operation type (e.g., read and write mixture), the size of the I/O operations, the I/O operation rates (e.g., number of reads/second, number of writes/second), and the like.

The cache, like other data storage system resources, may be a finite resource whereby the data storage system may have a limited amount of cache for storing user data in connection with servicing read and/or write operations, such as described above. In a multi-tiered storage environment as described herein, the cache may be used for servicing I/Os with physical devices having a wide range in performance capabilities. For example, for illustration, consider an embodiment having 3 storage tiers as described elsewhere herein—a first storage tier of flash or SSD drives, a second storage tier of FC 10K or 15K RPM rotating disk drives, and a third storage tier of rotating SATA 7.2K RPM disk drives. The following is the performance ranking, from highest performance to lowest performance, of such tiers based on physical performance capabilities of the different drive types and technologies: flash/EFD or SSD (highest performance), FC (middle or second ranked performance), and SATA (lowest or slowest performance).

It should be noted that an embodiment in accordance with techniques herein which is a multi-tiered storage environment may generally include any other types of physical storage devices, associated protocols (e.g., PCI, SAS, FC), and the like. For example, an embodiment may include storage tiers of any one or more of SAS 10K RPM rotating disk drives, SAS 15K RPM rotating disk drives, and/or SAS 7.2K RPM rotating disk drives alone, or in combination with, tiers of other drives.

In environments such as a multi-tiered storage environment, techniques may be performed to prevent overconsumption of the cache. For example, one approach may define a static consumption cache limit, such as in the inclusive range of 2-5%, denoting a maximum amount of the cache that may be consumed in connection with pending writes directed to any single LUN. Responsive to the LUN consuming the threshold amount of cache for pending writes, processing may be performed to artificially introduce an additional time delay between consecutive writes directed to the LUN. However, problems exist with use of such static cache consumption limits for pending writes per LUN. For example, the same limit may be applied to each of the LUNs. Even though a single LUN is limited in terms of the amount of cache that can be consumed for its pending writes, the overall cache consumption may still exceed an overall desirable maximum limit in that the aggregate or collective amount of cache used in connection with pending writes for multiple LUNs may exceed the desirable maximum limit. Additionally, such per LUN static cache consumption limit does not take into account the LUN-to-physical device layout or mapping and the actual physical device performance capabilities or limits. For example, there may be 10 LUNs configured on a single physical SATA drive. If each LUN is allowed to consume 5% of cache for pending writes, it means that the single SATA drive is allowed to consume 50% of the system cache for its pending writes. If there are multiple SATA drives similarly configured, then the cache may reach an overall desirable maximum cache consumption limit thereby adversely affecting overall data storage system performance for I/Os as well as adversely impacting the performance of other processing or tasks performed on the data storage system which result in additional I/O operations. An example of such other processing performed in the data storage system is data storage movement optimizations, which automatically provide for moving data portions between storage tiers as the workload of such data portions may change over time. The trigger condition as to when the time delay may be introduced may be based only on cache consumption as described above with a per-LUN maximum cache consumption threshold, or when cache consumption exceeds a system threshold amount, such as 75%. In such cases the additional time delay may be introduced in connection with writes directed to all LUNs. Thus, use of such a trigger condition only considers cache consumption as a trigger and does not, for example, take into account other back end activity such as read I/Os and may additionally impact performance of all LUNs.

It should also be noted that in some existing systems which use, for example, the per LUN write pending limits noted above, such systems may also incorporate additional techniques. For example, prior to reaching a system level cache consumption threshold such as 50%, read operations may have priority over write operations for processing. When the 50% threshold is reached or exceeded, however, read and write operations may have the same processing priority. Also generally, existing system may use techniques for limiting cache consumption by partitioning cache consumed based on limits.

What will be described in following paragraphs are techniques for delaying or throttling host I/Os (e.g., reads and/or writes) by injecting a time delay, when needed, based on the dynamically changing workload or performance of back end physical devices, such as may be measured using response times, utilizations, and any other suitable performance or workload metric of each of the back end physical devices. Such techniques described herein facilitate preventing I/Os directed to the slower physical devices, such as SATA drives, from overconsuming the cache, such as with write pending data waiting to be written out to such slower physical devices which may adversely impact other faster performance drives, such as FC and EFD drives. The inventors have determined that when pending writes directed to one or more slower PDs, such as a SATA drives, consume a large amount of cache such as causing the overall amount of cache consumption to exceed a maximum threshold (e.g., more than 75%), other pending writes directed to higher performance PDs, such as EFD drives, may be adversely impacted in terms of performance. For example, there may be an insufficient amount of cache available for storing the other pending writes directed to the higher performance PDs whereby processing other pending writes cannot commence until required cache slots are available. There may also be an adverse performance impact due to additional cache management processing performed, such as in attempts to locate cache slots including data that may be evicted (e.g., read data).

Such techniques herein provide for enforcing a target time delay and artificially introducing an additional time delay, when needed, between consecutive I/Os, such as reads and/or writes, directed to a target physical device in order to maintain the target time delay. The target time delay may vary with an observed response time determined for the target physical device. For example, an average response time (RT) may be determined for a physical device (PD) where the average RT is measured based on RTs observed for a time period with respect to both back-end read and write operations. As the RT observed for the PD increases, this signifies increasing PD workload or activity and also increasing consumption of data storage system resources, including cache, for I/Os directed to this PD. If the observed RT for a time period exceeds a desired maximum or target RT, processing may be performed using techniques herein to slow down the rate at which host I/Os directed to the PD are processed thereby decreasing the data storage system resources, such as cache, consumed in processing the PD's I/Os. In attempts to reduce the data storage system resources (such as cache) consumed at a single point in time in connection with host I/Os directed to the PD, the data storage system may perform processing to enforce a minimum target time delay occurring between two consecutive host I/Os directed to the PD to slow down the incoming I/O processing rate for the PD and thus reduce the amount of consumed cache associated with the processing of such I/Os directed to the PD. Since the goal is to decrease the rate at which host I/Os directed to the PD are serviced, a target host I/O processing rate, with respect to host I/Os directed to the PD, may be determined which is less than the currently observed or actual host I/O processing rate with respect to I/Os directed to the PD. Thus, the target time delay between consecutive host I/Os directed to the same PD is generally less than the current time delay between such consecutive host I/Os directed to the same PD. As described below in more detail and as will be appreciated by those skilled in the art, the target time delay between consecutive host I/Os may be determined based on the target host I/O processing rate and the current time delay between consecutive host I/Os may be determined based on the currently observed host I/O processing rate. When seeking to reduce the I/O rate and cache consumed with respect to host I/Os directed to the PD, the target time delay between consecutive host I/Os directed to the PD may be generally any suitable time value larger than a current observed average time delay between consecutive host I/Os directed to the PD. As may be needed to maintain the target time delay as a minimum time delay between consecutive host I/Os directed to the PD, the data storage system may artificially inject, as needed, a time delay between pairs of consecutive host I/Os directed to the PD.

In an embodiment, whether to utilize techniques herein and possibly artificially introduce an additional time delay between consecutive host I/Os directed to a PD may be determined as a function of the workload or performance of the back end resource, the PD. For example, if the RT of a PD is below an acceptable RT threshold, it may be determined not to utilize techniques herein with respect to I/Os directed to the PD. Thus, the trigger condition of whether to utilize techniques herein may be based on the observed RT of individual PDs so that techniques herein may be selectively utilized on those PDs. Another metric that may be used is utilization of the PD. In one embodiment, the utilization may be modeled or estimated based on the observed RT for the PD. If the utilization of a PD is below an acceptable utilization threshold, it may be determined not to utilize techniques herein with respect to I/Os directed to the PD. Thus, the trigger condition of whether to utilize techniques herein may be based on the utilization of individual PDs so that techniques herein may be selectively utilized on those PDs.

Such techniques herein use a metric, such as average RT or utilization for a PD may be determined with respect to all reads and writes directed to the PD thereby considering overall activity and utilization of the PD in connection with host-generated I/Os as well as other additional activity directed to the PD such as, for example, due to tasks and optimizations performed within the data storage system. For example, the other additional activity or workload on a PD may be due to data storage system internal tasks such as disk initialization, data storage system movement optimizations, RAID group internal rebuilds, and the like. Thus, the initial decision or trigger condition of whether to employ techniques herein for a particular PD may be characterized as a function of the workload, performance and/or utilization of the PD, such as based any of an observed RT, utilization, and the like, for the PD.

Techniques described herein provide for real time throttling of host I/O operations per PD responsive to dynamically changing backend physical device performance in a multi-tier environment. The target time delay between consecutive host I/Os may vary with each individual PD. Techniques herein take into account the LUN-PD layout. For example, there may be 10 LUNs configured on a single physical SATA drive whereby techniques herein take into account the current and dynamically changing workload of the 10 LUNs directed to the SATA drive and the impact in performance on the single physical SATA drive. In an embodiment in accordance with techniques herein, a target time delay between consecutive host I/Os enforced for the SATA drive affects only I/Os directed to the particular SATA drive. The target time delay may be a minimum time delay between consecutive host I/Os that is maintained or enforced with respect to the workload or activity of the 10 LUNs having storage provisioned on the SATA drive. Additionally, the target time delay may be dynamically adjusted responsive to changes in the SATA drive performance at various times. Thus, techniques herein may use a performance feedback mechanism whereby the target time delay may be increased or decreased responsive to dynamically changing PD backend performance (e.g., such as measured in terms of RT, utilization, or any other suitable metric).

Figure 9:
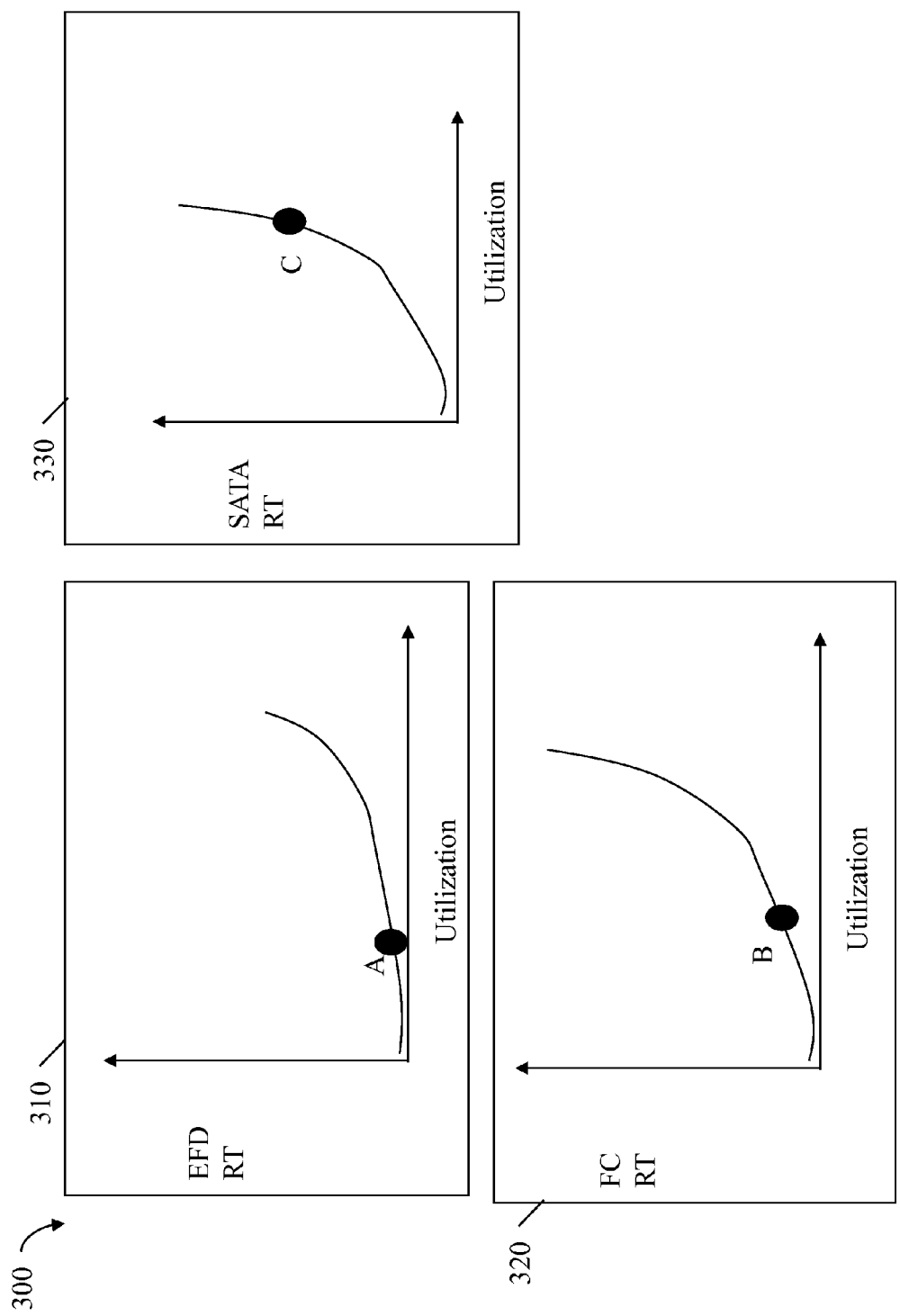
FIG. 9 is an example of performance curves that may be used in an embodiment in accordance with techniques herein.

Reference is now made to FIG. 9 for illustration of techniques herein. The example 300 includes 3 performance curves 310, 320 and 330. The curve 310 may illustrate a hypothetical characteristic curve for an EFD drive where drive utilization is on the horizontal or X axis and RT is on the vertical or Y axis. The utilization may be expressed in terms of percentage from 0-100% with 100% representing the maximum performance capability or limit of the EFD drive (e.g., at 100% utilization, a drive is incapable of processing I/Os as a higher I/O processing rate). The curve 310 may be determined based on expected performance characteristics of the EFD drive given a particular workload mixture of reads and writes and a particular average I/O size. The particular workload mixture and average I/O size modeled by the curve 310 may approximate that as based on observed I/O characteristics for the EFD drive. Thus measurement of an observed RT for reads and writes directed to the EFD drive may be used to determine a corresponding point A on the curve. Point A may represent the current observed RT and associated modeled utilization for an EFD drive in the data storage system. Similarly, curves 320 and 330 may illustrate hypothetical characteristic curves, respectively, for a FC rotating disk drive and a SATA rotating disk drive in the data storage system. Point B may represent the current observed RT and associated utilization for the FC drive (e.g., such as a 10K RPM or 15K RPM FC drive) in the data storage system. Point C may represent the current observed RT and associated utilization for the SATA drive (e.g., such as a 7.2K RPM SATA drive) in the data storage system. It should be noted that the observed RTs illustrated may be obtained using any suitable time period and technique. For example, each of the RTs associated with the points A, B and C may be determined as an average RT for a corresponding one of the PDs with respect to all I/Os directed to the PD during a specified time period. The RT may be an average RT with respect to all I/Os, both reads and writes, directed to the PD. For an observed RT for a PD, a point on the curve may be determined having the observed RT value and the utilization indicated by the point may represent the modeled utilization using the curve.

Thus, points A, B and C may represent currently observed performance of three different PDs at a first point in time. A determination may be made regarding whether to perform techniques herein for each of the PDs—the EFD drive, the FC drive and the SATA drive. Point A may indicate that the EFD drive currently has an acceptable observed RT and a corresponding acceptable utilization level. In other words, point A may denote the observed RT that is at, or below, a target RT, and may also denote that the current modeled utilization level that is at or below a target utilization level. Similarly, point B may indicate that the FC drive currently has an acceptable observed RT and utilization level. However, point C may indicate that the SATA drive currently has an unacceptable observed RT and an unacceptable modeled utilization level. For example point C may indicate that the SATA drive has an observed RT of 25 milliseconds (ms) and a corresponding utilization of over 70%. For the SATA drive having current performance illustrated by point C, the observed RT of 25 ms. may exceed an established target or acceptable RT, such as 12 ms. and the corresponding utilization may exceed a target of acceptable utilization, for example, may exceed 60%.

An embodiment may use multiple performance curves such as illustrated in FIG. 9 for each different drive type or technology whereby each such curve may represent RT and associated utilization for a different workload (e.g., different average I/O size, different read/write mixture or ratio, different types of read streams (heavy sequential read or heavy random read), different types of write streams (heavy sequential write or heavy random write).

It should be noted that some embodiments may form a pool of multiple PDs to which I/Os are directed. In such a case where the workload to the PDs is balanced or approximately evenly distributed across all PDs of the pool, the RT for each PD of the pool may be based on the average RT observed for all I/Os directed to the pool. In the event that the workload directed to the pool is imbalanced or not approximately evenly distributed across all PDs of the pool, the workload of each individual PD may be considered and used to determine the performance of each individual PD. An embodiment may form RAID groups of multiple PDs of the same drive type or technology in various suitable RAID configurations (e.g., RAID-1, RAID-5 and/or RAID-6). In this case, an embodiment may determine the performance of each PD in the RAID group based on the workload or I/Os directed to each PD of the RAID group. As will be appreciated by those skilled in the art and as described in more detail herein, the target time delay may be specified per PD with respect to host I/Os directed to particular data portions at the sub-LUN level which are stored on the PD.

Figure 10:
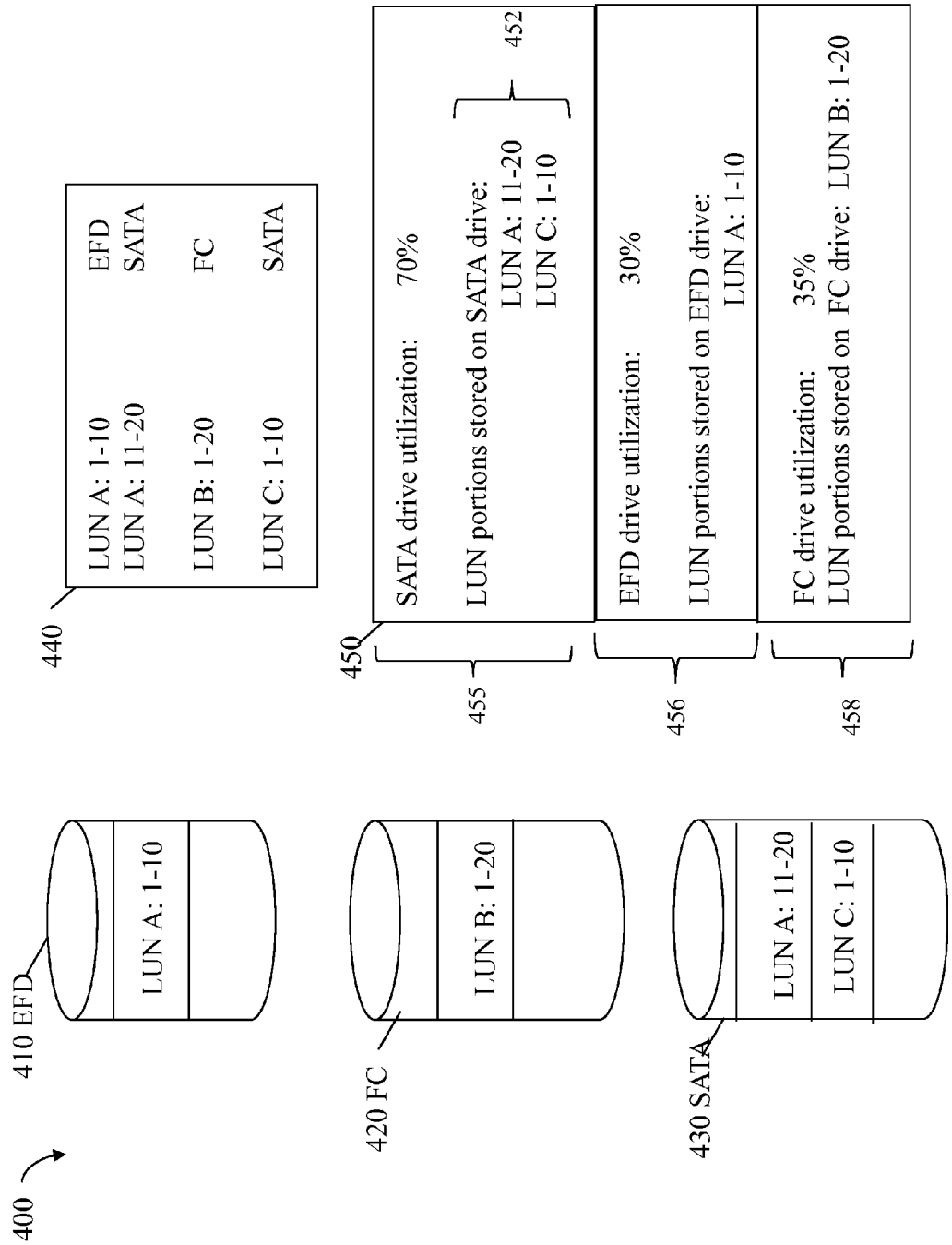
FIG. 10 is an example illustrating a LUN-PD layout or configuration and a set of information that may be determined and published by a DA in an embodiment in accordance with techniques herein.

In accordance with techniques herein continuing with the example from FIG. 9, processing may be performed to determine the utilization of each PD and also the corresponding LUNs, or portions of LUNs, having data stored on the different PDs 410, 420 and 430 with reference now to FIG. 10.

Referring to FIG. 10, shown is an example 400 illustrating the LUN to PD layout in an embodiment in accordance with techniques herein. For simplicity in illustration, the example 400 illustrates LUNs that are thick whereby all the physical storage for the entire LBA is provisioned when the LUN is created. A thick LUN is in contrast to a thin or virtually provisioned LUN or logical device described in more detail elsewhere herein whereby storage is not allocated for the entire LUN's logical address space when the LUN is initially created. Rather, with thin or virtually provisioned LUNs, storage may be allocated and mapped to a subset or subrange of the LUN's entire logical address range as writes are performed to addresses in the subset or subrange. Thus, although techniques herein may be used in connection with thin devices as described elsewhere, thick LUNs are illustrated now for simplicity. Additionally, for simplicity, only single PDs of each tier are illustrated along with abbreviated logical address ranges. However, more typically, provisioned storage for a LUN may be made with respect to a RAID group including multiple PDs of a tier. As will be appreciated by those skilled in the art, techniques herein may be readily extended for use with such multiple PDs in a RAID group configuration.

In the example 400, EFD drive 410 may have the current performance, as expressed in terms of RT and associated corresponding utilization, as illustrated by 310 in FIG. 9. FC drive 412 may have the current performance, as expressed in terms of RT and associated corresponding utilization, as illustrated by 320 in FIG. 9. SATA drive 430 may have the current performance, as expressed in terms of RT and associated corresponding utilization, as illustrated by 330 in FIG. 9. Element 440 may represent the LUN to PD mapping information describing the provisioned physical storage mapped to each of the provisioned LUNs. LUN A has an LBA (logical block address) range of 1-20 where data for LBAs 1-10 is currently stored on EFD drive 410 and data for LBAs 11-20 is stored on SATA drive 430. LUN B has an LBA (logical block address) range of 1-20 where data for LBAs 1-20 is currently stored on FC drive 420. LUN C has an LBA (logical block address) range of 1-10 where data for LBAs 1-10 is currently stored on SATA drive 430.

Based on the mapping information 440 as illustrated in the example 400, LUN A, LBA 11-20 and LUN C, LBA 1-10 have data stored on the SATA drive 430. As described below in more detail, techniques herein may be selectively applied to host I/Os directed only to affected LUNs, or LUN portions, having data stored on the SATA drive 430 (e.g., due to the 70% utilization rate of drive 430) so that any time delays introduced between consecutive host I/Os affect only those host I/Os directed to the LUNs, or LUN portions, having data stored on the SATA drive 430 (e.g., only affects host I/Os directed to LUN A, LBA 11-20 and LUN C, LBA 1-10 have data stored on the SATA drive 430).

It should be noted that determination of the particular LUNs, or LUN portions, mapped to SATA drive 430 is needed since the incoming host I/Os specify read and write target locations expressed in terms of a LUN and logical address (e.g., LBA) denoting an offset in the LUN's logical address range.

In accordance with techniques herein, an embodiment may artificially inject a time delay, as may be needed to maintain a target time delay, between consecutively received host I/Os directed to LUNs or LUN portions having data stored on the SATA drive 430. The foregoing may be performed to facilitate reducing the amount of cache and other resources consumed at a point in time for I/Os directed to the SATA drive 430.

In one embodiment, a target time delay may be determined representing the target desired amount of time delay that should be enforced between two consecutive I/Os directed to the SATA drive 430. The target time delay is generally larger than a current observed average time delay between consecutive host I/Os directed to the SATA drive 430 in order to slow down the processing of host I/Os directed to the SATA drive 430. Based on the target time delay, an artificial time delay may be introduced, as needed, between consecutive host I/Os in order to maintain or enforce the target time delay as a minimum delay between consecutive host I/Os. Thus, in determining the target time delay, the observed or actual average host I/O processing rate (e.g., number of I/Os—both reads and writes—per second) directed to the SATA drive 430 may be determined. The currently observed average amount of time between host I/Os may be determined from the observed host I/O processing rate. For example, the current host I/O processing rate for host I/Os directed to the SATA drive 430 may be 100 I/Os per second thereby indicating an average 0.010 second delay between consecutive host I/Os directed to PD 430. Thus, an embodiment may select a target time delay between consecutive host I/Os which exceeds 0.010 seconds, the actual average time delay between consecutive host I/Os.

An embodiment may generally use any suitable technique to select the target time delay enforced for a PD where the target time delay is larger than the current time delay between consecutive host I/Os directed to the PD (e.g., technique to determine an amount by which to decrease the current host I/O processing rate and thereby increase the time delay between consecutive host I/Os). Described below is one technique that may be used to select the target time delay between consecutive host I/Os directed to a PD.

As just described, an embodiment may selectively apply use of techniques herein to one or more PDs in a data storage system such as the SATA drive 430 responsive to observed performance due to current workload directed to each PD.

Element 450 includes information that may be output by the DA for use by one or more HAs, or other front end components, receiving host I/Os in an embodiment in accordance with techniques herein. The information 450 may include utilization information and LUN portions stored on the various PDs for each of the PDs 410, 420 and 430 serviced by the DA. Records 455, 456, and 458, respectively, may represent the information output by the DA regarding SATA drive 430, EFD drive 410 and FC drive 420.

As represented by record 455, the DA servicing the SATA drive 430 may determine the affected LUNs and LUN portions 452 currently stored on the SATA drive 430 as just described and illustrated by the information included in 440. Additionally, given the observed performance (e.g., RT observed) for SATA drive 430, a modeled utilization of 70% may be determined. The DA servicing the SATA drive 430 may obtain the current observed average RT for the drive as represented by point C in 330 of example 300. From this, the DA may determine the corresponding modeled utilization level, such as 70%, using performance curve 330. The DA may output information 455 including the utilization level of 70% for the single PD and then identify the affected LUN portions 452 having data stored on the single PD. The information 455 output by the DA for the SATA drive 430 indicates that a single PD has the current utilization of 70%, and that the following LUN portions 452 are stored on the single PD: LUN A, LBA 11-20 and LUN C, LBA 1-10. As described in more detail below, a single target time delay between consecutive host I/Os may be enforced with respect to all I/Os directed to any of the affect LUN portions 452 viewed in the aggregate.

It should be noted that the DA need not communicate to the HA in this information 455 anything about the particular drive type or technology (e.g., such as that the PD having the 70% utilization level is a SATA drive). Rather use of utilization levels may be characterized as providing a level of abstraction regarding the actual PD characteristics and performance capabilities. Use of utilization levels regarding PDs provides a measure of normalization regarding each PD.

Similar to the information 455 for the first PD, the SATA drive, the DA may also output information regarding other PDs. The information 456 may specify a current utilization level and LUN portions stored on a second PD, the EFD drive. The information 458 may specify a current utilization level and LUN portions stored on a third PD, the FC drive.

The DA may then communicate such information 450 to front end adapters, such as one or more HAs, which receive host I/Os. For example, the DA may communicate the information 450 by storing such information in a portion of global memory accessible by the HAs. To further illustrate with reference to this particular example 400, the DA may store information as represented by 450 in global memory. The HAs may then read the information 450 from global memory for use in connection with processing received host I/Os. For example, an HA may read the information for the 3 PDs as represented by the 3 different records 455, 456 and 458. The HA may determine that techniques herein for selection and enforcement of a target time delay is only needed for the first PD having corresponding information 455 with the current utilization of 70%. The other PDs have acceptable utilization levels and associated performance (RT) and, in one embodiment, the HA may choose to selectively implement techniques herein for those PDs having a current utilization level which exceeds a particular threshold. In this example, techniques herein may be applied to PDs having a current utilization equal to or greater than 70%.

Continuing with the example 400, the HA may selectively apply techniques herein to the SATA drive 430 having current information as represented by 455. The HA may obtain a current host I/O processing rate for host I/Os (both reads and writes) directed to the LUN portions denoted by 452. The current average host I/O processing rate may be obtained through observing received host I/Os for a time period. For example, the current host I/O processing rate for host I/Os directed to the SATA drive 430, and thus LUN portions 452, may be 100 I/Os per second thereby indicating an average 0.010 second delay between consecutive host I/Os directed to PD 430. Thus, an embodiment may select a target time delay between consecutive host I/Os which exceeds 0.010 seconds, the actual average time delay between consecutive host I/Os. For example, an embodiment may first select a target host I/O processing rate, such as 60 host I/Os per second, which is less than the current host I/O processing rate. From the target host I/O processing rate, an embodiment may determine a target time delay of 0.0167 seconds between consecutive host I/Os. The HA may then perform processing as described herein to maintain and enforce the current target time delays for the different physical devices, such as for the SATA drive 430 based on information 450.

Rather than output information 450 for all PDs serviced by the DA, an embodiment in accordance with techniques herein may alternatively have the information 450 communicated from the DA only include information for those PDs for which techniques herein are performed to determine and enforce a target time delay. In other words, if a LUN portion is not included in the information 450, it may be implied that there is no need to enforce a target time delay with respect to host I/Os directed to the LUN portion. For example, rather than output all the information 450 for PDs 410, 420 and 430, the DA may selectively only output the information 455 for the SATA drive 430 having a current average RT and associated current utilization which are not at acceptable performance levels.

A feedback technique may be employed to determine and enforce a target time delay for I/Os directed to single PD responsive to current performance of the PD. In this example, the current performance of the PD may be indicated by the utilization level for a PD. At subsequent points in time, the target time delay may be modified, no longer enforced, and the like, responsive to observed performance for the PD at such subsequent points in time. For example, at a second subsequent point in time, the target time delay between consecutive host I/Os directed to a PD may be further increased to be more aggressive in further reducing the observed utilization for the PD if it is determined that the current PD utilization was not sufficiently reduced based on a prior target time delay. As another example, at a second subsequent point in time, the HA may no longer enforce a target time delay for the PD if the HA determines that a current utilization for the PD has dropped to an acceptable level below the specified threshold.

Figure 11:
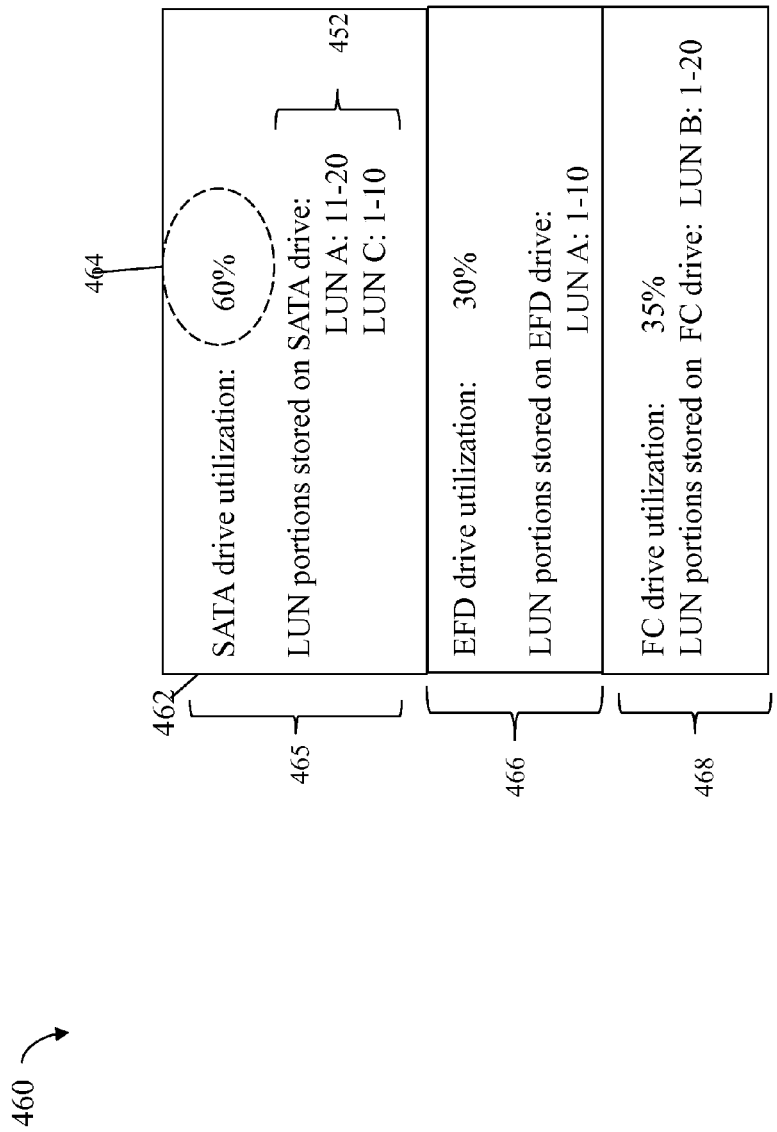
FIG. 11 is an example of another instance of information that may be published by the DA in an embodiment in accordance with techniques herein.

To further illustrate, at a first point in time, the HA may obtain a first set of information 450 including 455 and determine a first target time delay for host I/Os directed to SATA drive 430 responsive to the SATA drive 430 having a 70% utilization level. For example, as described above, the HA may determine that the current host I/O processing rate for the SATA drive 430 is 100 IOPS thereby indicating an average time delay of 0.010 seconds between consecutive host I/Os. The HA may determine a target host I/O processing rate of 60 IOPS thereby indicating a target time delay of 0.0167 seconds. The HA may perform processing to enforce and maintain the increased time delay of 0.0167 seconds between consecutive host I/Os directed to any LUN portion of 452 having data stored on the SATA drive 430. At a second later point in time, the DA may again determine the average physical device RT for each of the PDs 410, 420 and 430 and may again determine a revised current utilization using the performance curves of 300. The DA may publish a new set of information 460 of FIG. 11 corresponding to the observed performance for each PD and the current LUN portions stored on each PD at the second point in time. As indicated in the example 460, records 465, 466 and 468, respectively, include information regarding PDs 430, 410 and 420 for the second point in time. Record 466 now indicates that the utilization 464 of the SATA drive 430 has decreased to an acceptable level of 60% (thus also indicating that the corresponding RT has also been reduced as modeled by performance curve 330). Responsive to the utilization for the SATA drive decreasing to 60% as included in record 465, the HA may decide to no longer enforce and maintain a target time delay between consecutive host I/Os directed to LUN portions stored on the SATA drive as represented by 452.

Thus, the second set of information 462 may provide feedback to the HA regarding the physical drive performance at the second point in time. Such information may reflect the current performance of different PDs whereby the current performance may be due to naturally occurring changes in host I/O workload and/or the result of a change in host I/O workload due to enforcement of any current target time delays in effect.

As described in more detail below, in order to maintain and enforce a target time delay between consecutive I/Os directed to a PD, an artificially injected time delay may be introduced if needed to maintain the target time delay as an average time delay minimum between consecutive host I/Os.

The time delay that may be introduced using techniques herein to delay I/Os directed to a particular PD may be done on the data storage system as described. In one embodiment, the average observed RT may be determined for each PD and a utilization corresponding to the observed RT for each PD may be determined, such as through estimation or modeling using the performance curves described herein. Subsequently, the particular LUN or LUN portions, mapped to each PD are determined. In this manner an observed RT, and corresponding utilization, may be determined for a PD with respect to different portions of a LUN's logical address space having data stored on the PD. Thus, the observed performance reflects the current workload of the PDs depending on the LUN-PD configuration. A time delay may be determined for a LUN address space portion that varies with the underlying PD provisioned/providing the backing physical storage.

The HA may receive the host I/Os and may artificially introduce any needed time delay between consecutive host I/Os to maintain or enforce the target time delay using any suitable technique. For example with reference to FIG. 10, the HA may receive information 450. Responsive to the information 455 for the first PD, the SATA drive 430, indicating a utilization level of 70%, the HA may determine a target time delay of 0.0167 seconds as described above to be enforced as the current target time delay between consecutive host I/Os directed to SATA drive 430 (e.g., where such host I/Os have a target location in any LBA portion denoted by 452). The HA may receive an I/O directed to a target location expressed as a LUN and logical address (e.g., LBA) on the LUN. The HA may examine the information 452 and determine whether the target location of the host I/O operation is included in a LUN portion of 452. For example, the target location of a received host I/O operation may be LUN A, LBA 16. The HA may determine that the target location is within the LBA range of LUN A, LBA 11-20 of 452 located on a PD, the SATA drive 430, having a current utilization rate of 70% as included in 455. Thus, the HA may determine the appropriate target time delay of 0.0167 seconds to be maintained or enforced between I/Os directed to a LUN, or LBA range thereof. Accordingly, the HA may introduce any needed additional delay between consecutive I/Os directed to the LUN, or LBA range thereof, in order to maintain such a target time delay. It should be noted that the target time delay is enforced with respect to consecutive I/Os directed to the same PD, the SATA drive 430, which is with respect to all LUN and LBA ranges having data stored on the SATA drive 430. For example, the information 450 indicates that the target time delay of 0.0167 seconds is enforced with respect to I/Os directed to the collective aggregate or union of LUN A, LBA 11-20 and LUN C, LBA 1-10.

As a first technique, the HA may track the amount of time that has elapsed since commencing servicing of the last/previous I/O directed to the SATA drive 430 whereby the amount of time is the amount that has elapsed since servicing the last/previous I/O directed to any of LUN A, LBA 11-20 and LUN C, LBA 1-10. For example, at a first point in time, the HA may receive a first I/O directed to a first target location on LUN A within the LBA range 11-20, and the first I/O may be serviced. At a second point in time subsequent to the first point in time, a second I/O directed to a second target location on LUN C within the LBA range 1-10 of LUN C may be received. The HA may track the amount of time that has elapsed since the first point in time (e.g., determine the amount of time between the first and second points in time). The amount of actual elapsed time may be compared to the target time delay. If the amount of actual elapsed time is less than the target time delay, the HA may return a response to the second I/O to the host requesting that the host reissue or retry the I/O. Otherwise, if the amount of elapsed time is equal to or greater than the target time delay, the HA may commence servicing the second I/O and wait for the next subsequent I/O to be received. It should be noted that if the amount of actual elapsed time is less than the target time delay whereby the second I/O is not processed, the HA may wait until the next host I/O is received and repeat processing just described (e.g., again determine whether the actual elapsed time since the previously performed first I/O is less than the target time delay and either process the I/O is the elapsed time is not less than the target time delay, and otherwise return a response to the host to retry/reissue the I/O). In this manner, the HA may not process a received host I/O unless an amount of time that has elapsed since the last previously performed I/O is equal to, or greater than, the target time delay. Thus, the HA may artificially inject an additional amount of delay time, if needed, between consecutively performed host I/Os directed to the SATA drive 430 in order to enforce the target time delay as a minimum amount of time delay between consecutively performed host I/Os directed to the SATA drive 430.

Figure 12:
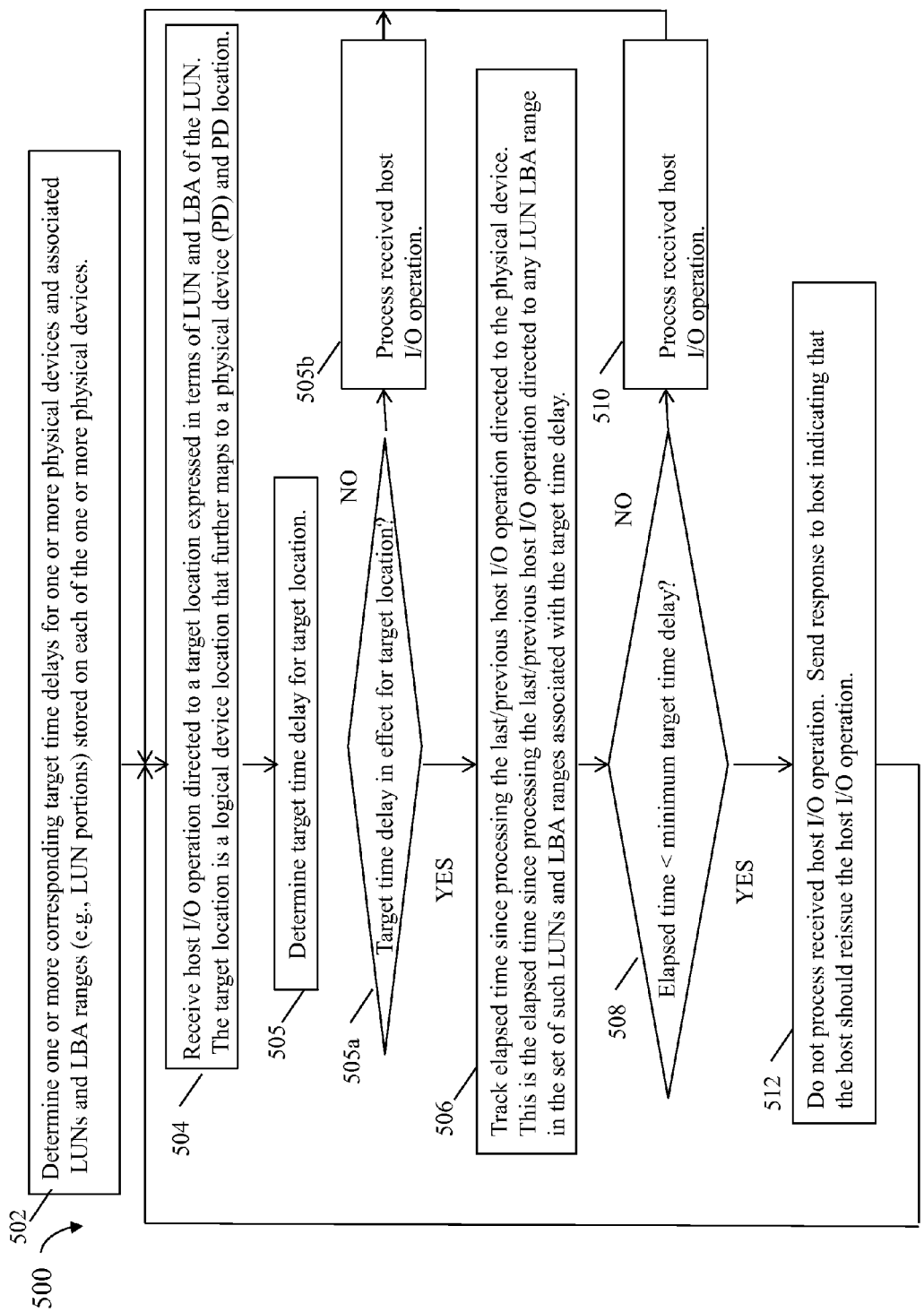
FIGS. 12-14 are flowcharts of processing steps that may be performed in an embodiment in accordance with techniques herein.

Referring to FIG. 12, shown is a flowchart 500 summarizing processing as just described that may be performed in an embodiment in accordance with techniques herein. Such processing of 500 may be performed by the HA or other front end component that receives host I/Os. At step 502, the HA may obtain the next set of information, such as represented by 450 in the example 400 and 462 in the example 460, from global memory. Responsive to the current performance, such as indicated by the utilization levels for the PDs, the HA may further determine as part of step 502 processing whether to determine and enforce a target time delay for each PD and associated LUN portions stored on the PD. For those PDs having utilization levels above an acceptable or threshold level (e.g., thereby indicating current workload, I/O processing rate and resource consumption should be reduced), step 502 may include determining, for each such PD, a current target time delay for consecutive I/Os directed to the PD. At step 504, the HA may receive a host I/O operation directed to a target location expressed in terms of a LUN and LBA of the LUN. Consistent with description elsewhere herein, the target location in the host I/O operation may be characterized as a logical device location that further maps to a physical device (PD) and PD location. For example, as described above in connection the example 400, a logical device target location in a host I/O operation may be mapped to a PD location on SATA drive 430. At step 505, the target time delay in effect, if any, for the target location is determined based on the information read from global memory in step 502. As described elsewhere herein, the target time delay is selected for the particular PD to which the target location of the host I/O is mapped. At step 505*a*, a determination is made as to whether there is any time delay in effect or currently being enforced for the PD currently storing the data of the target location. If step 505*a* evaluates to no, processing proceeds to step 505*b* to process the received host I/O operation. Control then proceeds to step 504 to process any next host I/O operation. If step 505*a* evaluates to yes, control proceeds to step 506.

At step 506, the elapsed time is tracked since processing the last/previous host I/O operation directed to the particular physical drive having the target time delay selected in step 505. The elapsed time in step 506 may be determined as the elapsed time since processing the last/previous host I/O operation directed to any target logical device location included in the set of logical addresses associated with the physical device having the target time delay selected in step 505. For example, with reference to element 450 in the example 400, the set of logical addresses includes LUN A, LBA 11-20 and LUN C, LBA 1-10. At step 508, a determination is made as to whether the elapsed time is less than the minimum target time delay. If step 508 evaluates to no, control proceeds to step 510 to process the received host I/O operation. Control proceeds to step 504 to await the next received host I/O operation. If step 508 evaluates to yes, control proceeds to step 512 where the host I/O operation received is not processed. Rather, a response is sent to the host indicating that the host should reissue the host I/O operation. Thus, by performing step 512 rather than 510, the HA may artificially inject an additional amount of delay time, if needed, between consecutively performed host I/Os directed to the physical drive in order to enforce the target time delay as a minimum amount of time delay between consecutively performed host I/Os directed to the physical device (having the target time delay selected in step 505). Control then proceeds from step 512 to step 504 to await the next host I/O operation.

It should be noted that more generally, the HA may introduce an additional time delay, if needed, using other suitable techniques. For example, the HA may delay servicing of a received I/O such as by buffering received I/Os in a queue, list or other structure. If an HA receives a host I/O operation and the amount of elapsed time since performing the prior host I/O operation is not at least the target time delay, the HA may buffer the host I/O operation in the list. The HA may select a next received host I/O from the list for servicing after an amount of time equal to the target time delay has elapsed. It will be appreciated by those skilled in the art that the list may have a limited number of entries thereby allowing only a threshold number of I/Os to be buffered and processing may be further performed to maintain and use the list with techniques herein.

As yet another technique, rather than enforcing the target time delay and possibly introducing an additional delay with respect to when servicing of the host I/O commences, the HA may introduce a delay when returning a response to the host I/O thereby delaying sending the acknowledgement to the host that the host I/O has completed. This technique introduces the delay by monitoring the elapsed time between acknowledgments sent to the host for completed host I/Os directed to the same physical device. With this technique, as a host I/O completes, the elapsed time since the last acknowledgement for a host I/O directed to the physical device may be determined in manner similar to that as described above and in connection with flowchart 500. The HA may send an acknowledgement regarding host I/O completion for a next completed host I/O once the amount time equal to the desired delay has elapsed since the previous host acknowledgement was sent for any host I/O directed to the physical device.

It should be noted that based on the foregoing, delaying a response to an outstanding I/O request may cause the host to not send another subsequent I/O request until such acknowledgement regarding a currently outstanding host I/O is received. The host may track how many host I/O requests are outstanding or in-progress awaiting a response from the data storage system. In some embodiments, there may be a maximum number of allowable outstanding host I/O requests tracked by the host such that, for example, the host may not send another I/O request once that maximum is reached until the host receives an acknowledgement regarding a currently outstanding host I/O is received. The acknowledgement generally indicates a response status (success, failure or retry) for a currently outstanding host I/O. The acknowledgement received may indicate that either the I/O request has completed successfully or may otherwise indicate that the I/O has failed, the host should reissue the I/O, or some other suitable status.

Figure 13:
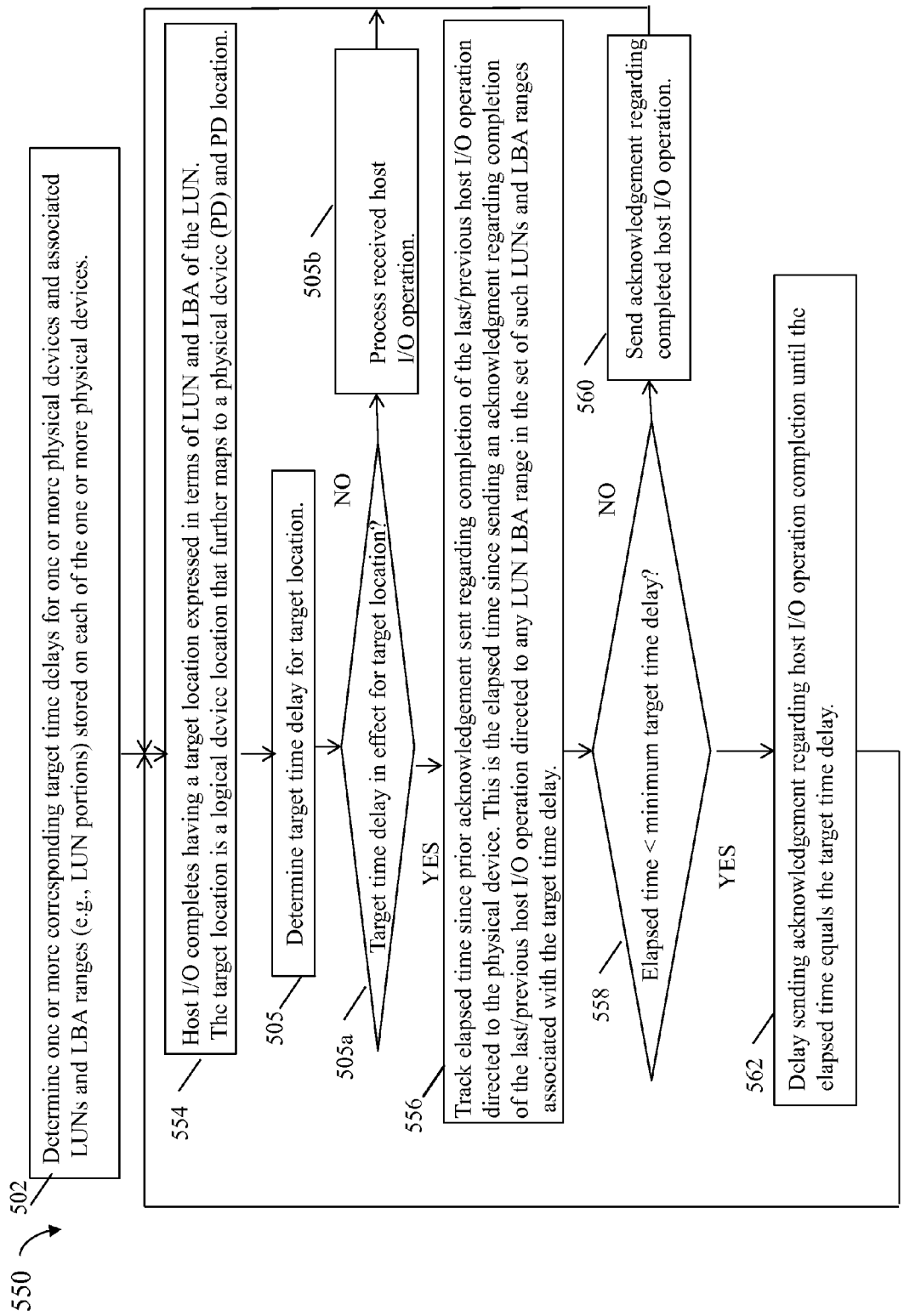

Referring to FIG. 13, shown is a flowchart 550 summarizing processing as just described that may be performed in an embodiment in accordance with techniques herein when enforcing a target time delay by possibly delaying host I/O acknowledgements. Such processing of 550 may be performed by the HA or other front end component that receives host I/Os. It should be noted that flowchart 550 includes steps 502, 505, 505*a* and 505*b* as described above in connection with flowchart 500.

At step 502, the HA may obtain the next set of information, such as represented by 450 in the example 400 and 462 in the example 460, from global memory, and may also determine any needed target time delays. At step 554, a host I/O operation completes having a target location expressed in terms of a LUN and LBA of the LUN. Consistent with description elsewhere herein, the target location in the host I/O operation may be characterized as a logical device location that further maps to a physical device (PD) and PD location. For example, as described above in connection the example 400, a logical device target location in a host I/O operation may be mapped to a PD location on SATA drive 430. At step 505, the target time delay in effect, if any, for the target location is determined. At step 505*a*, a determination is made as to whether there is a target time delay in effect for the PD storing data for the target location. If step 505*a* evaluates to no, control proceeds to step 505*b* where the host I/O is processed. Control then proceeds to step 554. If step 505*a* evaluates to yes, control proceeds to step 556.

At step 556, the elapsed time is tracked since the prior acknowledgement was sent to a host regarding completion of the last/previous host I/O operation directed to the physical drive. This may be determined as the elapsed time since sending an acknowledgement regarding completion of the last/previous host I/O operation directed to any target logical device location included in the set of logical addresses associated with the target time delay selected in step 555. For example, with reference to element 450 in the example 400, the set of logical addresses includes LUN A, LBA 11-20 and LUN C, LBA 1-10. At step 558, a determination is made as to whether the elapsed time is less than the minimum target time delay. If step 558 evaluates to no, control proceeds to step 560 to send an acknowledgement to the host regarding completion of the host I/O operation from step 554. Control proceeds to step 554 to await the completion of the next outstanding host I/O operation. If step 558 evaluates to yes, control proceeds to step 562 where the HA delays sending the acknowledgement to the host regarding completion of the host I/O from step 554 until the elapsed time equals the target time delay. Thus, by performing step 562, the HA may artificially inject an additional amount of delay time, if needed, between consecutively performed host I/Os directed to the physical drive in order to enforce the target time delay as a minimum amount of time delay between consecutively sent acknowledgement regarding completion of host I/Os directed to the physical device. Control then proceeds from step 562 to step 554 to await the next host I/O operation.

An embodiment in accordance with techniques herein may perform processing to maintain or enforce target time delays between consecutive host I/O operations directed to physical devices. Such an embodiment may optionally utilize such techniques in combination with one or more other techniques to limit resource consumption. For example, an embodiment may utilize a static consumption cache limit in combination with techniques just described to enforce the target time delays between consecutive host I/Os. To further illustrate, an embodiment may specify a static consumption cache limit, such in the inclusive range of 2-5%, for each LUN. In this case, the static consumption cache limit indicates a maximum or upper bound as a percentage of total cache that may be used by a single LUN. Such a limit may be used as a "safety net" to ensure that I/Os directed to a single LUN do not exceed the maximum limit of cache consumption. Thus, an embodiment may use the techniques described herein to enforce target time delays (which are dynamically determined and enforced responsive to current back end physical device performance) in combination with a static consumption cache limit for each LUN or logical device.

As described herein, the target time delay for a first physical device may be enforced with respect to all host I/Os, both reads and writes, directed to the first physical device. As a variation, the target time delay between host I/Os for the first physical device may be enforced with respect to only writes or only reads rather than all I/Os collectively. For example, an embodiment may decide to enforce the target time delay with respect to only consecutive host write operations thereby allowing host read operations to be processed without considering the target time delay.

As a further variation, an embodiment may use different target time delays for different types of I/Os directed to a PD. For example, a first target time delay with respect to host read I/Os directed to PD may be enforced and a second target time delay (different from the first target time delay) may be enforced with respect to host write I/Os directed to the same PD. The HA may determine the first and second target time delays, respectively, for host read and write operations, using different weighting factors. For example, the HA may determine the first and second target time delays based on a weighting factor or ratio of 1:5 indicating that the second target time delay (between consecutive host writes) is 5 times more than the first target time delay (between consecutive host reads).

Techniques herein may be performed with respect to host I/O operations directed to any suitable logical device. As described herein, host I/O may be directed to LUNs which are thick logical devices as well as thin or virtually provisioned devices. Thin or virtually provisioned devices are described elsewhere herein. In an embodiment using techniques herein where host I/Os are directed to thin devices, the HA, or more generally front end component receiving host I/Os, may enforce target time delays for a data portion size at the sub-LUN level corresponding to a subrange of the LUN address space such as illustrated, for example in FIG. 10. In an embodiment with thin devices, the size of the data portion may, for example, correspond to a size granularity selected in accordance with any of an allocation unit size (denoting the atomic unit or an amount of storage allocated at a time when allocating storage for thin devices), a size equal to an amount of storage moved in connection with data movement optimization processing, and the like. Thus, with thin devices, the LUN portion information for each PD such as included in 450 and 460 may be similarly represented where each LUN portion may be of a suitable granularity.

Figure 14:
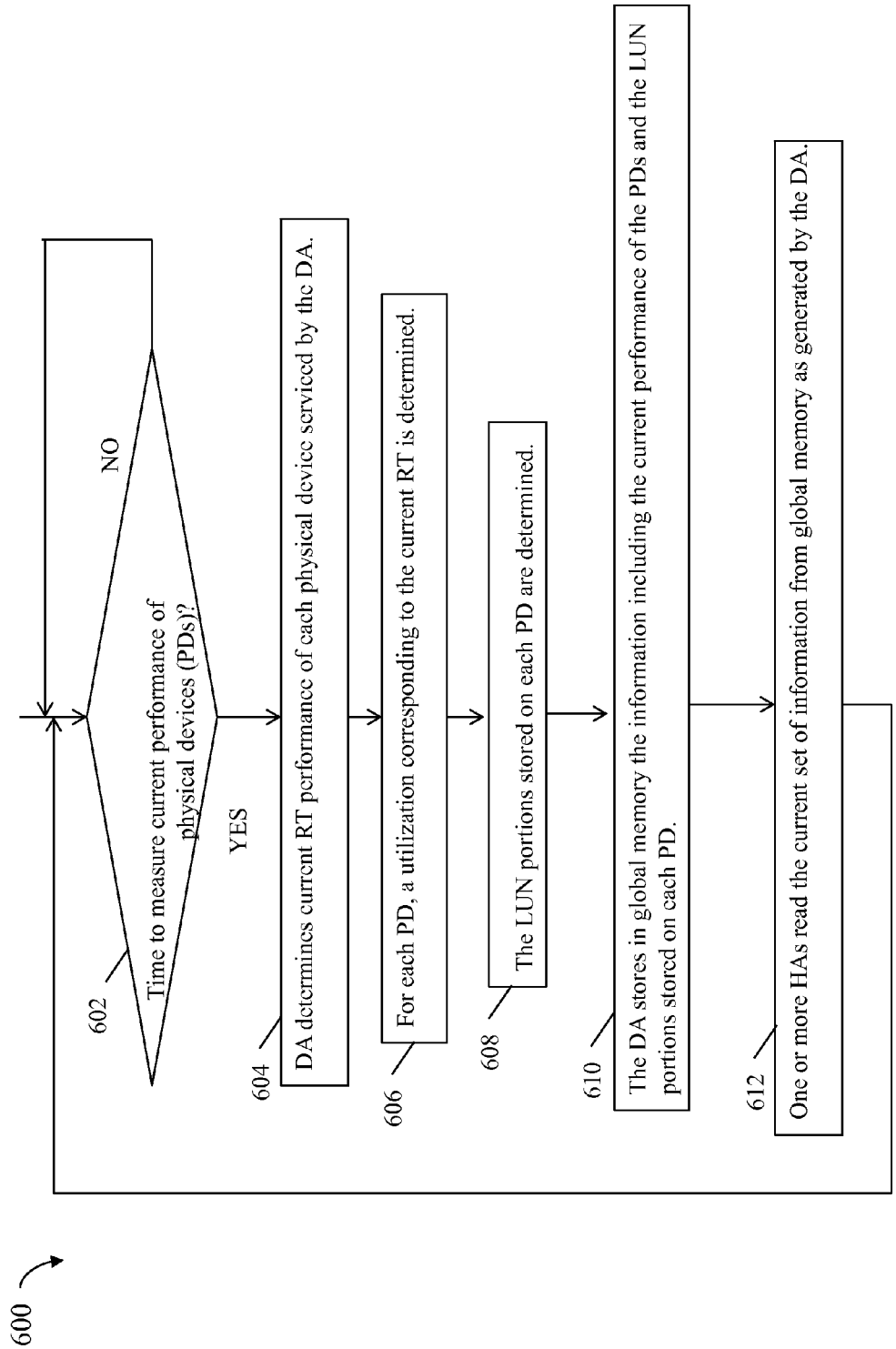

Referring to FIG. 14, shown is a flowchart of processing steps that may be performed in an embodiment in accordance with techniques herein. Flowchart 600 summarizes processing as described herein with respect to information the DA determines and communicates to the HAs or front end components receiving host I/Os. In step 602, a determination is made as to whether it is time for a DA to measure the current performance of PDs serviced by the DA. In one embodiment, such information regarding current PD performance may be obtained regularly at periodic time intervals and/or in response to other trigger events. Control remains at step 602 until a trigger event occurs causing collection of current performance data for the PDs serviced by the DA. If step 602 evaluates to yes, control proceeds to step 604 where the DA determines the current RT performance of each PD serviced by the DA. At step 606, for each such PD, utilization corresponding to the current RT is determined. At step 608, the LUN portions stored on each PD are determined. In step 610, the DA stores in global memory the information including the current performance of the PDs (as indicated by the utilization of each PD determined in step 606) and the LUN portions stored on each PD (as determined in step 608). In step 612, one or more HAs, or more generally front end components, which receive host I/Os read the current set of information from global memory as produced and stored by the DA in step 610. As described elsewhere herein, the HAs may use the information read from global memory for processing in order to decide whether to determine and enforce a target time delay between consecutive host I/Os directed to a PD. From step 612, processing returns to step 602 to await the generation of the next set of information by the DA.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:
1. A method of processing I/O (input/output) operations comprising:
    determining a first value of a first performance metric denoting any of a current workload or performance for a first physical device having data stored thereon that is any of read and written in servicing I/O operations, wherein said first value for the first performance metric for the first physical device is determined by performing first processing comprising:
  determining an observed response time for servicing I/O operations directed to the first physical device;
  selecting one of a plurality of performance curves in accordance with a physical drive type and workload characteristics of the first physical device, each of said plurality of performance curves denoting modeled performance characteristics of a particular type of physical drive for particular workload characteristics; and
  determining a utilization of the first physical device, wherein said utilization is a modeled or estimated utilization of the first physical device determined using the selected one of the plurality of performance curves and the observed response time, said utilization being used as the first value of the first performance metric for the first physical device;
identifying a target time delay for the first physical device based on the first value of the first performance metric, said target time delay specifying a minimum time delay between consecutive host I/Os directed to the first physical device; and
enforcing the target time delay with respect to consecutive host I/Os directed to the first physical device.

2. The method of claim 1, further comprising:
receiving, at a first point in time, a first host I/O operation directed to the first physical device of a data storage system;
receiving, at a second point in time, a second host I/O operation directed to the first physical device, said second host I/O operation and said first host I/O operation being consecutive host I/O operations directed to the first physical device;
tracking an elapsed time between said first point in time and said second point in time;
determining whether the elapsed time is less than said target time delay; and
if said elapsed time is less than said target time delay, delaying processing of the second host I/O operation.

3. The method of claim 2, further comprising:
if said elapsed time is not less than said target time delay, performing the second host I/O operation; and
if said elapsed time is less than said target time delay, processing of the second host I/O operation is delayed by returning a response to a host that sent the second host I/O operation, said response indicating to the host to reissue the second host I/O operation to the data storage system.

4. The method of claim 1, wherein said observed response time is determined based on read and write operations directed to the first physical device within a time period.

5. The method of claim 2, wherein said first host I/O operation identifies a first target location that is a first logical device and first logical block address in the logical address range of the first logical device, and wherein said second host I/O operation identifies a second target location that is a second logical device and second logical block address in the logical address range of the second logical device.

6. The method of claim 5, wherein the first target location maps to a first physical location on the first physical device and wherein the second target location maps to a second physical location on the first physical device.

7. The method of claim 2, wherein the first host I/O operation results in performing one or more backend I/O operations to the first physical device and wherein the second host I/O operation results in performing one or more backend I/O operations to the first physical device.

8. The method of claim 1, wherein a first received host I/O operation directed to the first physical device is not processed until an amount of time has elapsed since commencing processing of a previous host I/O operation directed to the first physical device whereby said amount of time that has elapsed is any of equal to, or greater than, said target time delay.

9. The method of claim 1, further comprising:
completing servicing for a first host I/O operation directed to the first physical device of a data storage system;
sending, at a first point in time to a host that issued the issued the first host I/O operation, a first acknowledgement regarding completion of the first host I/O operation;
completing, at a second point in time, servicing for a second host I/O operation directed to the first physical device, said second host I/O operation and said first host I/O operation being consecutively completed host I/O operations directed to the first physical device;
tracking an elapsed time between said first point in time and said second point in time;
determining whether the elapsed time is less than said target time delay; and
if said elapsed time is less than said target time delay, delaying sending a second acknowledgement to a host which issued the second host I/O operation until an amount of time that is equal to the target time delay has elapsed.

10. The method of claim 9, wherein if said elapsed time is not less than said target time delay, sending a second acknowledgement to a host which issued the second host I/O operation without injecting an additional time delay.

11. The method of claim 1, wherein the first value of the first performance metric denotes any of a current workload or performance for the first physical device for a time period with respect to all read operations which read data from a physical location on the first physical device and all write operations which write data to a physical location on the first physical device.

12. The method of claim 11, the first value of the first performance metric denoting any of a current workload or performance for the first physical device includes a first I/O workload due to host I/O operations processed during the time period, and includes a second I/O workload due to additional processing performed within the data storage system.

13. The method of claim 12, herein said additional processing includes any of a data movement optimization that moves a data portion between different storage tiers responsive to a change in workload of the data portion, a RAID group rebuild, and initialization of a physical device.

14. The method of claim 1, wherein the first physical device is included in a data storage system having a plurality of storage tiers of physical drives having different performance characteristics and capabilities, said first physical device being included in a first of the plurality of storage tiers.

15. The method of claim 1, wherein said enforcing the target time delay with respect to consecutive host I/Os directed to the first physical device includes queuing received host I/Os and commencing processing of a next one of the host I/Os that is queued responsive to an amount of time elapsing which equals the target time delay.

16. The method of claim 1, wherein the target time delay is enforced with respect to any of: only consecutive host write I/Os directed to the first physical device, only consecutive host read I/Os directed to the first physical device, and both host read and write operations directed to the first physical device.

17. A data storage system comprising:
- a disk adapter that accesses one or more physical devices for performing I/O (input/output) operations to the one or more physical devices, said disk adapter including a first non-transitory computer readable medium comprising code stored thereon that, when executed, performs a method comprising:
  - determining first information including a first value of a first performance metric denoting any of a current workload or performance for a first of the one or more physical devices serviced by the disk adapter and having data stored thereon that is any of read and written in servicing I/O operations, said first information also identifying, for said first physical device, one or more logical device address portions having data stored on said first physical device, wherein said first value for the first performance metric for the first physical device is determined by performing first processing comprising:
    - determining an observed response time for servicing I/O operations directed to the first physical device;
    - selecting one of a plurality of performance curves in accordance with a physical drive type and workload characteristics of the first physical device, each of said plurality of performance curves denoting modeled performance characteristics of a particular type of physical drive for particular workload characteristics; and
    - determining a utilization of the first physical device, wherein said utilization is a modeled or estimated utilization of the first physical device determined using the selected one of the plurality of performance curves and the observed response time, said utilization being the first value of the first performance metric for the first physical device; and
  - storing the first information in a global memory;
- a front end component that receives host I/O operations, said front end component including a second non-transitory computer readable medium comprising code stored thereon that, when executed, performs a method comprising:
  - reading the first information from the global memory;
  - identifying a target time delay for the first physical storage device based on the first value of the first performance metric for the first physical device, said target time delay specifying a minimum time delay between consecutive host I/Os directed to the first physical device; and
  - enforcing the target time delay with respect to consecutive host I/Os directed to the first physical device.

18. A non-transitory computer readable medium comprising executable code stored thereon for processing I/O (input/output) operations, the non-transitory computer readable medium comprising code stored thereon that, when executed, performs a method comprising:
- determining a first value of a first performance metric denoting any of a current workload or performance for a first physical device having data stored thereon that is any of read and written in servicing I/O operations, wherein said first value for the first performance metric for the first physical device is determined by performing first processing comprising:
  - determining an observed response time for servicing I/O operations directed to the first physical device;
  - selecting one of a plurality of performance curves in accordance with a physical drive type and workload characteristics of the first physical device, each of said plurality of performance curves denoting modeled performance characteristics of a particular type of physical drive for particular workload characteristics; and
  - determining a utilization of the first physical device, wherein said utilization is a modeled or estimated utilization of the first physical device determined using the selected one of the plurality of performance curves and the observed response time, said utilization being used as the first value of the first performance metric for the first physical device;
- identifying a target time delay for the first physical device based on the first value of the first performance metric, said target time delay specifying a minimum time delay between consecutive host I/Os directed to the first physical device; and
- enforcing the target time delay with respect to consecutive host I/Os directed to the first physical device.

* * * * *